(12) United States Patent
Zargar et al.

(10) Patent No.: US 10,122,863 B2
(45) Date of Patent: Nov. 6, 2018

(54) FULL DUPLEX VOICE COMMUNICATION SYSTEM AND METHOD

(71) Applicant: Microsemi Semiconductor (U.S.) Inc., Austin, TX (US)

(72) Inventors: Tanmay Zargar, Austin, TX (US); Dillon Reed Ritter, Austin, TX (US); Rodolfo Silva, Austin, TX (US); Eric Bass, Austin, TX (US); Francis Chukwuemeka Onochie, Escondido, CA (US)

(73) Assignee: MICROSEMI SEMICONDUCTOR (U.S.) INC., Austin, TX (US)

( * ) Notice: Subject to any disclaimer, the term of this patent is extended or adjusted under 35 U.S.C. 154(b) by 0 days.

(21) Appl. No.: 15/683,862

(22) Filed: Aug. 23, 2017

(65) Prior Publication Data

US 2018/0077290 A1 Mar. 15, 2018

Related U.S. Application Data

(60) Provisional application No. 62/394,204, filed on Sep. 13, 2016.

(51) Int. Cl.
*H04M 9/08* (2006.01)
*G10L 21/0232* (2013.01)
(Continued)

(52) U.S. Cl.
CPC ......... *H04M 9/082* (2013.01); *G10L 21/0232* (2013.01); *G10L 25/84* (2013.01); *H04B 3/21* (2013.01); *H04B 3/234* (2013.01)

(58) Field of Classification Search
CPC ..... G10L 19/012; G10L 21/0208; H04B 3/23; H04M 3/2227; H04M 9/082; H04M 9/085; H04R 3/002
(Continued)

(56) References Cited

U.S. PATENT DOCUMENTS 4,965,822 A * 10/1990 Williams ............... H04M 9/082
379/388.02
5,646,990 A 7/1997 Li
(Continued)

FOREIGN PATENT DOCUMENTS

EP 0855827 A2 7/1998
SA 98/0761 8/1998
WO 00/25441 A1 5/2000

OTHER PUBLICATIONS

Junghsi Lee; Hsu-Chang Huang; "A Robust Double-Talk Detector for Acoustic Echo Cancellation"; Proceedings of the International MultiConference of Engineers and Computer Scientists 2010, vol. II, Mar. 2010, pp. 1239-1242; published by International Association of Engineers, Hong Kong.
(Continued)

*Primary Examiner* — Gerald Gauthier
(74) *Attorney, Agent, or Firm* — Simon Kahn

(57) ABSTRACT

A full duplex voice communication method constituted of: estimating an acoustic echo within a near-end signal; cancelling the estimated acoustic echo; detecting whether, or not, a change has occurred in a near-end acoustic echo path, the received near-end signal represents speech and the received far-end signal represents silence, wherein, responsive to the results thereof, the method is further constituted of: alternately attenuating frequency components of the echo cancelled near-end signal by a first frequency domain attenuation value and by a second greater frequency domain attenuation value; alternately attenuating a first function of the frequency component attenuated echo cancelled near-end signal by a first switchable attenuation value and by a second greater switchable attenuation value; and alternately attenuating a second function of the received far-end signal
(Continued)

by a third switchable attenuation value and by a fourth greater switchable attenuation value.

20 Claims, 11 Drawing Sheets

(51) Int. Cl.
  *G10L 25/84* (2013.01)
  *H04B 3/21* (2006.01)
  *H04B 3/23* (2006.01)

(58) Field of Classification Search
  USPC .......... 370/287; 379/406.02, 406.07, 406.08, 379/406.1, 406.14, 388.04, 406.01, 379/406.06; 381/66, 71.1, 71.11; 704/208, 224, 227
  See application file for complete search history.

(56) References Cited

U.S. PATENT DOCUMENTS

| | | | |
|---|---|---|---|
| 5,646,991 A | 7/1997 | Sih | |
| 5,920,834 A | 7/1999 | Sih et al. | |
| 6,141,415 A * | 10/2000 | Rao | H04M 9/082 379/406.08 |
| 6,597,787 B1 | 7/2003 | Lindgren et al. | |
| 6,795,547 B1 | 9/2004 | Bjarnason | |
| 7,243,065 B2 | 7/2007 | Stephens et al. | |
| 7,480,595 B2 | 1/2009 | Nishiyama | |
| 8,077,857 B1 * | 12/2011 | Lambert | H04M 9/082 379/406.02 |
| 8,320,554 B1 * | 11/2012 | Chu | H04M 9/082 379/406.08 |
| 8,520,859 B2 | 8/2013 | Li et al. | |
| 8,589,153 B2 | 11/2013 | Khalil et al. | |
| 8,953,777 B1 | 2/2015 | Chhetri | |
| 9,319,783 B1 * | 4/2016 | Barton | H04M 9/082 |
| 2003/0123674 A1 * | 7/2003 | Boland | H04M 9/082 381/66 |
| 2004/0218755 A1 * | 11/2004 | Marton | H04M 9/082 379/406.14 |
| 2006/0018457 A1 * | 1/2006 | Unno | H04M 9/082 379/388.04 |
| 2006/0018458 A1 * | 1/2006 | McCree | H04M 9/082 379/406.01 |
| 2006/0018459 A1 * | 1/2006 | McCree | H04M 9/082 379/406.06 |
| 2007/0174050 A1 * | 7/2007 | Li | G10L 21/02 704/208 |
| 2007/0217600 A1 * | 9/2007 | Kim | H04M 9/082 379/406.01 |
| 2007/0253565 A1 * | 11/2007 | Fozunbal | H04M 9/082 381/66 |
| 2008/0107279 A1 * | 5/2008 | Lai | H04B 3/23 381/66 |
| 2008/0240413 A1 | 10/2008 | Mohammad et al. | |
| 2008/0304675 A1 * | 12/2008 | Roovers | H04M 9/082 381/66 |
| 2009/0245527 A1 * | 10/2009 | Kumar | H04B 3/234 381/66 |
| 2009/0281800 A1 * | 11/2009 | LeBlanc | G10L 21/0208 704/224 |
| 2011/0228946 A1 | 9/2011 | Chen et al. | |
| 2012/0213380 A1 * | 8/2012 | Mahe | H04M 9/082 381/71.11 |
| 2014/0064476 A1 * | 3/2014 | Mani | H04M 9/082 379/406.08 |
| 2014/0334620 A1 * | 11/2014 | Yemdji | G10L 21/0232 379/406.08 |
| 2014/0334631 A1 * | 11/2014 | de Vicente Pena | G10K 11/16 381/71.1 |
| 2015/0181017 A1 | 6/2015 | Mani et al. | |
| 2016/0337510 A1 * | 11/2016 | Li, I | H04M 3/2236 |
| 2017/0064087 A1 * | 3/2017 | Mani | H04M 9/082 |
| 2017/0092281 A1 | 3/2017 | Zarger et al. | |
| 2017/0093460 A1 | 3/2017 | Zargar et al. | |

OTHER PUBLICATIONS

Liu, J.; Liang, W.; Liu, R.; "A Three-Class ROC for Evaluating Doubletalk Detectors in Acoustic Echo Cancellation"; IEEE International Conference on Acoustic, Speech and Signal Processing, Apr. 2009, pp. 205-208; IEEE New York, NY.

Per Ahgren; "Acoustic Echo Cancellation and Doubletalk Detection Using Estimated Loudspeaker Impulse Responses"; IEEE Transacations on Speech and Audio Processing, vol. 13, No. 6, Nov. 2005, pp. 1231-1237; IEEE New York, NY.

International Search Report for parallel application PCT/US2017/048294 issued by European Patent Office dated Nov. 20, 2017.

Written Opinion of the International Searching Authority for parallel application PCT/US2017/048294 issued by European Patent Office dated Nov. 20, 2017.

* cited by examiner

| | |
|---|---|
| 3000 | RECEIVE NEAR-END SIGNAL |
| 3010 | RECEIVE FAR-END SIGNAL FROM FAR-END COMMUNICATION DEVICE |
| 3020 | ESTIMATE ACOUSTIC ECHO WITHIN NEAR-END SIGNAL RESPONSIVE TO FAR-END SIGNAL |
| 3030 | CANCEL ESTIMATED ECHO FROM NEAR-END SIGNAL |
| 3040 | DETECT WHETHER OR NOT THERE IS A CHANGE IN A NEAR-END ACOUSTIC ECHO PATH |
| 3050 | DETECT WHETHER OR NOT NEAR-END SIGNAL REPRESENTS SPEECH |
| 3060 | DETECT WHETHER OR NOT FAR-END SIGNAL REPRESENTS SILENCE |
| 3070 | RESPONSIVE TO RESULT OF PATH CHANGE DETECTION, SPEECH DETECTION AND SILENCE DETECTION: ALTERNATELY ATTENUATE FREQ. COMPONENTS OF ECHO CANCELLED SIGNAL BY FIRST FREQ. DOMAIN ATTENUATION VALUE AND BY SECOND GREATER VALUE; ALTERNATELY ATTENUATE FIRST FUNCTION OF FREQ. COMPONENT ATTENUATED ECHO-CANCELLED SIGNAL BY FIRST SWITCHABLE ATTENUATION VALUE AND BY SECOND GREATER VALUE; AND ALTERNATELY ATTENUATE SECOND FUNCTION OF FAR-END SIGNAL BY THIRD SWITCHABLE ATTENUATION VALUE AND BY FOURTH GREATER VALUE |
| 3080 | (OPT.) ATTENUATION BY SECOND SWITCHABLE VALUE AND FOURTH SWITCHABLE VALUE RESPONSIVE TO DETECTION OF PATH CHANGE |
| 3090 | (OPT.) ATTENUATION BY SECOND FREQ. DOMAIN VALUE RESPONSIVE TO DETECTION OF COMBINATION OF: ECHO PATH CHANGE; NEAR-END SPEECH; AND NO FAR-END SILENCE |
| 3100 | (OPT.) RESPONSIVE TO RESULT OF PATH CHANGE DETECTION, SPEECH DETECTION AND SILENCE DETECTION, ALTERNATELY: NOT UPDATE ECHO ESTIMATION; UPDATE ESTIMATION AT FIRST SPEED; AND UPDATE ESTIMATION AT SECOND SPEED > FIRST SPEED, OPT. RESPONSIVE TO DETECTION OF COMBINATION OF ECHO PATH CHANGE, NO NEAR-END SPEECH AND NO FAR-END SILENCE |

FIG. 2E

FULL DUPLEX VOICE COMMUNICATION SYSTEM AND METHOD

BACKGROUND

During voice telecommunication, the voice of a speaker at a first end is output at a second end. The output voice is picked up by the microphone at the second end and is sent back to the speaker as an echo. In order to overcome the problem of the echo, an acoustic echo canceller is provided to estimate the acoustic echo and remove it from the signal output by the microphone. During start-up of the voice communication, the acoustic echo canceller provides rapid echo cancellation, however the rapid echo cancellation methods generally overshoot and cancel voice which is not echo. Therefore, after start-up the acoustic echo canceller enters a steady state mode where the acoustic estimation is more accurate, however response to changes is not as rapid as during the start-up.

In the event that there is a change in the acoustic echo path between the speaker and the microphone, such as when someone waves his hand in front of the microphone or speaker, the steady state of the acoustic echo canceller is unable to properly estimate the acoustic echo and the echo cancellation is less effective, causing echo on the voice communication. Therefore, an acoustic echo path change detector is provided in order to detect a change in the acoustic echo path. If a change in the acoustic echo path is detected, the acoustic echo canceller is switched to the rapid start-up mode in order to fix the acoustic echo estimation and improve the echo cancellation.

Additionally, full duplex voice communication systems provide cancellation of other background noises in order to provide high quality communication.

Unfortunately, the speed and accuracy of prior art full duplex voice communications systems require improvement in order to improve the quality of voice communication.

SUMMARY OF THE INVENTION

Accordingly, it is a principal object of the present invention to overcome at least some of the disadvantages of prior art full duplex voice communication systems. This is provided in one embodiment by a full duplex voice communication system comprising: a near-end input port arranged to receive a near-end signal; a far-end input port in communication with a far-end communication device and arranged to receive a far-end signal from the far-end communication device; an acoustic echo estimation functionality arranged, responsive to the received far-end signal, to estimate an acoustic echo within the received near-end signal; an acoustic echo cancellation functionality arranged to cancel the estimated acoustic echo from the received near-end signal; a frequency domain processing functionality; a first switchable attenuation functionality; a second switchable attenuation functionality; an echo path change detection functionality arranged to detect a change in a near-end acoustic echo path; a near-end speech detection functionality arranged to detect whether the received near-end signal represents speech; a far-end silence detection functionality arranged to detect whether the received far-end signal represents silence; and a system coordination unit, wherein responsive to an output of the echo path change detection functionality, an output of the near-end speech detection functionality and an output of the far-end silence detection functionality, the system coordination unit is arranged to: control the frequency domain processing functionality to alternately attenuate frequency components of the echo cancelled near-end signal by a first frequency domain attenuation value and by a second frequency domain attenuation value, the second frequency domain attenuation value greater than the first frequency domain attenuation value; control the first switchable attenuation functionality to alternately attenuate a first function of an output of the frequency domain processing functionality by a first switchable attenuation value and by a second switchable attenuation value, the second switchable attenuation value greater than the first switchable attenuation value; and control the second switchable attenuation functionality to alternately attenuate a second function of the received far-end signal by a third switchable attenuation value and by a fourth switchable attenuation value, the fourth switchable attenuation value greater than the third switchable attenuation value.

In one embodiment, the arrangement of the system coordination unit to control the first switchable attenuation functionality to attenuate the first function of the output of the frequency domain processing functionality by the second switchable attenuation value and the arrangement of the system coordination unit to control the second switchable attenuation functionality to attenuate the second function of the received far-end signal by the fourth switchable attenuation value is responsive to detection of an acoustic echo path change by the echo path change detection functionality. In another embodiment, the arrangement of the system coordination unit to control the frequency domain processing functionality to attenuate the frequency components of the echo cancelled near-end signal by the second frequency domain attenuation value is responsive to a combination of all three of: detection of an acoustic echo path change by the echo path change detection functionality; detection by the near-end speech detection functionality that the received near-end signal represents speech; and detection by the far-end silence detection functionality that the received far-end signal does not represent silence.

In one embodiment, responsive to the output of the echo path change detection functionality, the output of the near-end speech detection functionality and the output of the far-end silence detection functionality, the system coordination unit is further arranged to control the acoustic echo estimation functionality to alternately: not update the estimated acoustic echo; update the estimated acoustic echo at a first speed; and update the estimated acoustic echo at a second speed, the second speed greater than the first speed. In one further embodiment, the arrangement of the system coordination unit to control the acoustic echo estimation functionality to update the estimated acoustic echo at the second speed is responsive to a combination of all three of: detection of an acoustic echo path change by the echo path change detection functionality; detection by the near-end speech detection functionality that the received near-end signal does not represent speech; and detection by the far-end silence detection functionality that the received far-end signal does not represent silence.

In one embodiment, the system further comprises a noise estimation functionality, wherein responsive to detection by the near-end speech detection functionality that the received near-end signal does not represent speech and detection by the far-end silence detection functionality that the received far-end signal represents silence, the system coordination unit is further arranged to control the noise estimation functionality to estimate near-end background noise responsive to the received near-end signal, and wherein the system coordination unit is further arranged to control the frequency domain processing functionality to output to the far-end output port a noise function of the estimated near-end background noise responsive to a combination of all three of: no detection of an acoustic echo path change by the echo path change detection functionality; detection by the near-end speech detection functionality that the received near-end signal does not represent speech; and detection by the far-end silence detection functionality that the received far-end signal does not represent silence.

In one embodiment, the system further comprises: a near-end saturation detection functionality arranged to detect an amplitude level of the received near-end signal; and a speaker saturation detection functionality arranged to detect an amplitude level of the received far-end signal, wherein the system coordination unit is further arranged, responsive to one of the detected amplitude level of the received near-end signal exceeding a near-end saturation value and the detected amplitude level of the received far-end signal exceeding a far-end saturation value, to control the acoustic echo estimation functionality to not update the estimated acoustic echo. In another embodiment, the system further comprises: a near-end narrow band signal detection functionality arranged to detect a representation of a narrow band tone within the received near-end signal; and a far-end narrow band signal detection functionality arranged to detect a representation of a narrow band tone within the received far-end signal, wherein the system coordination unit is further arranged, responsive to one of the detected near-end narrow band tone and the detected far-end narrow band tone, to control the acoustic echo estimation functionality to not update the estimated acoustic echo.

In one embodiment, the echo path change detection functionality comprises: a time domain path change detection functionality arranged to: perform a time domain analysis of the received near-end signal; detect a change in the near-end acoustic echo path responsive to the time domain analysis; and output an indication of the detected change, a frequency domain path change detection functionality arranged to: perform a frequency domain analysis of the received far-end signal and of the echo cancelled near-end signal; detect a change in the near-end acoustic echo path responsive to the frequency domain analysis; and output an indication of the detected change, and a combination path change detection functionality arranged to determine a third function of the output indication of the time domain path change detection functionality and the output indication of the frequency domain path change detection functionality, wherein the acoustic echo path change detection of the echo path change detection functionality is responsive to the determined third function of the outputs.

Independently, the embodiments provide for a full duplex voice communication method, the method comprising: receiving a near-end signal; receiving a far-end signal from a far-end communication device; estimating an acoustic echo within the received near-end signal responsive to the received far-end signal; cancelling the estimated acoustic echo from the received near-end signal; detecting whether, or not, a change has occurred in a near-end acoustic echo path; detecting whether, or not, the received near-end signal represents speech; and detecting whether, or not, the received far-end signal represents silence, wherein, responsive to a result of the near-end acoustic echo path change detection, a result of the near-end signal speech representation detection and a result of the far-end silence representation detection, the method further comprises: alternately attenuating frequency components of the echo cancelled near-end signal by a first frequency domain attenuation value and by a second frequency domain attenuation value, the second frequency domain attenuation value greater than the first frequency domain attenuation value; alternately attenuating a first function of the frequency component attenuated echo cancelled near-end signal by a first switchable attenuation value and by a second switchable attenuation value, the second switchable attenuation value greater than the first switchable attenuation value; and alternately attenuating a second function of the received far-end signal by a third switchable attenuation value and by a fourth switchable attenuation value, the fourth switchable attenuation value greater than the third switchable attenuation value.

In one embodiment, the attenuating the first function of the frequency component attenuated echo cancelled near-end signal by the second switchable attenuation value and the attenuating the second function of the received far-end signal by the fourth switchable attenuation value is responsive to detection of an acoustic echo path change. In another embodiment, the attenuating the frequency components of the echo cancelled near-end signal by the second frequency domain attenuation value is responsive to a combination of all three of: detection of an acoustic echo path change; detection that the received near-end signal represents speech; and detection that the received far-end signal does not represent silence.

In one embodiment, responsive to the result of the near-end acoustic echo path change detection, the result of the near-end signal speech representation detection and the result of the far-end silence representation detection, the method further comprises alternately: not updating the estimated acoustic echo; updating the estimated acoustic echo at a first speed; and updating the estimated acoustic echo at a second speed, the second speed greater than the first speed. Optionally, the updating the estimated acoustic echo at the second speed is responsive to a combination of all three of: detection of an acoustic echo path change; detection that the received near-end signal does not represent speech; and detection that the received far-end signal does not represent silence.

In one embodiment, the method further comprises: responsive to detection that the received near-end signal does not represent speech and detection that the received far-end signal represents silence, estimating near-end background noise responsive to the received near-end signal; and outputting a noise function of the estimated near-end background noise responsive to a combination of all three of: detection of no acoustic echo path change; detection that the received near-end signal does not represent speech; and detection that the received far-end signal does not represent silence. In another embodiment, the method further comprises: detecting an amplitude level of the received near-end signal; detecting an amplitude level of the received far-end signal; and responsive to one of the detected amplitude level of the received near-end signal exceeding a near-end saturation value and the detected amplitude level of the received far-end signal exceeding a far-end saturation value, not updating the estimated acoustic echo.

In one embodiment, the method further comprises: detecting whether, or not, a representation of a narrow band tone is present within the received near-end signal; detecting whether, or not, a representation of a narrow band tone is present within the received far-end signal; and responsive to one of detection of the narrow band tone representation within the received near-end signal and detection of the narrow band tone representation within the received far-end signal, not updating the estimated acoustic echo. In another embodiment, the echo path change detecting comprises: performing a time domain analysis of the received near-end signal; detecting a change in the near-end acoustic echo path responsive to the time domain analysis; outputting an indication of the time domain detected change; performing a frequency domain analysis of the received far-end signal and of the echo cancelled near-end signal; detecting a change in the near-end acoustic echo path responsive to the frequency domain analysis; outputting an indication of the frequency domain detected change; and determining a third function of the output time domain indication and the output frequency domain indication, wherein the acoustic echo path change detection is responsive to the determined third function Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2E illustrates a high level flow chart of a second full duplex voice communication method, according to certain embodiments;

DETAILED DESCRIPTION OF THE PREFERRED EMBODIMENTS

Figure 1A:
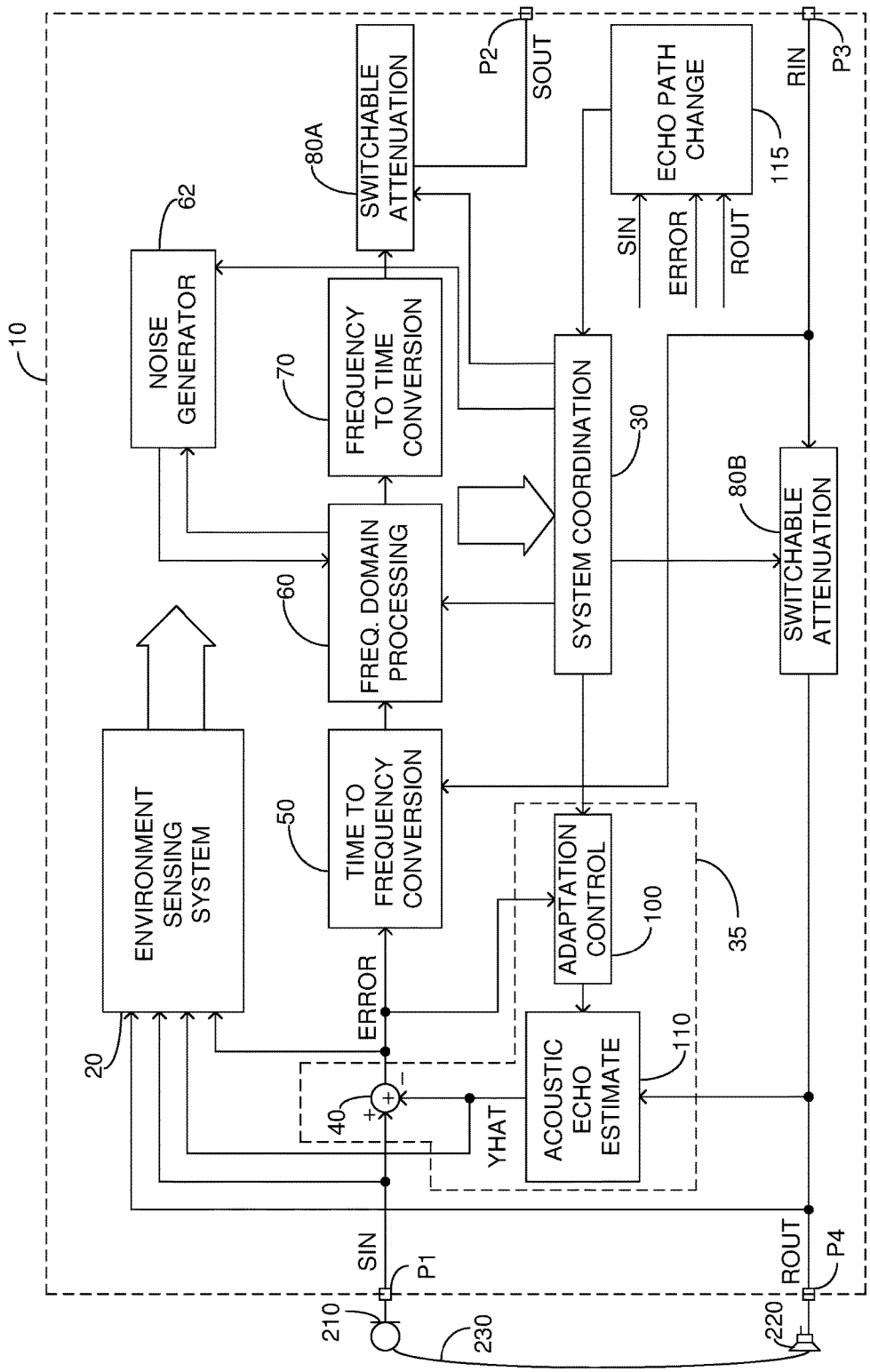
FIGS. 1A-1C illustrate various high level block diagrams of a full duplex voice communication system, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1B:
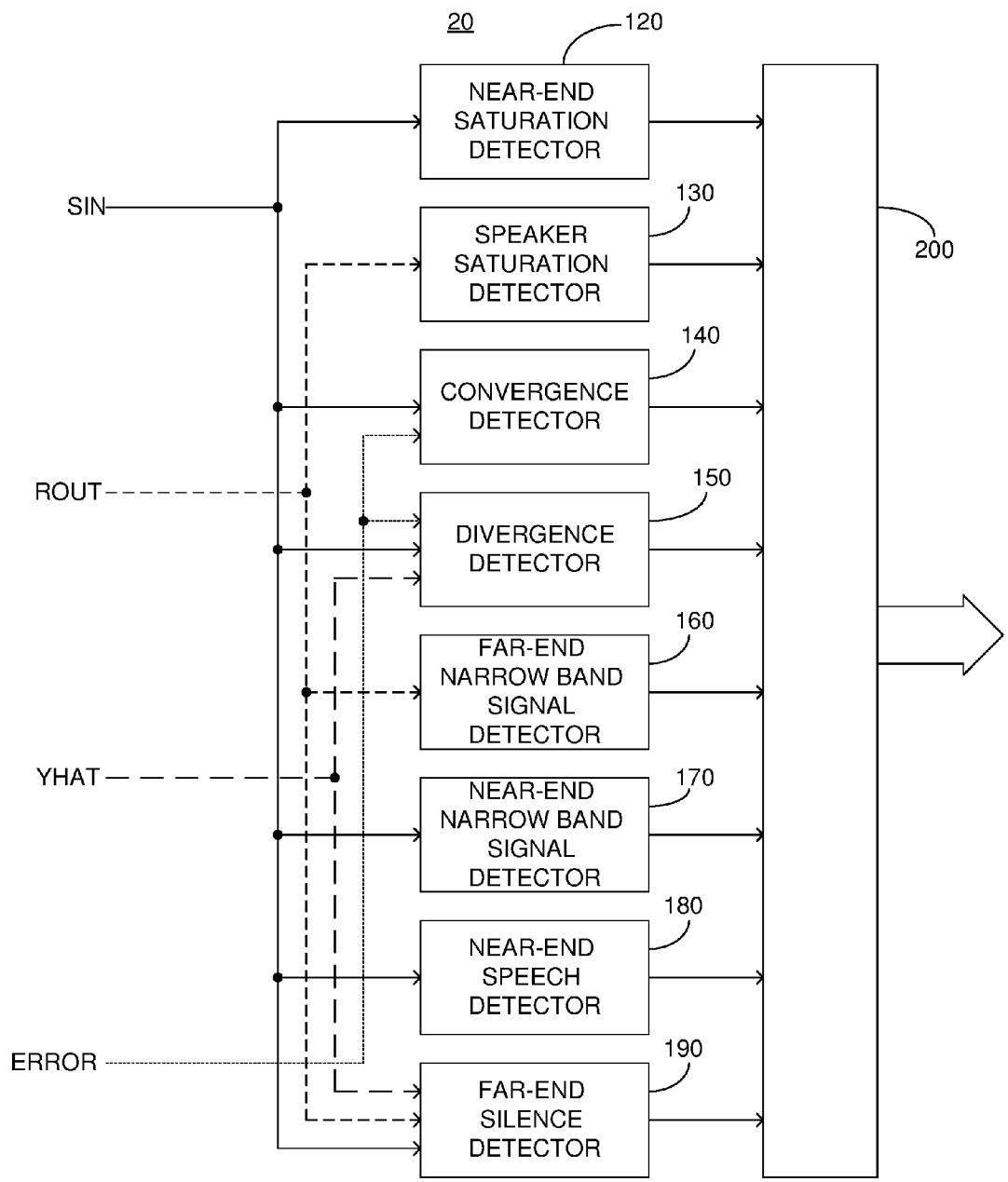

FIG. 1A illustrates a high level block diagram of a full duplex voice communication system 10, according to certain embodiments. Full duplex voice communication system 10 comprises: a plurality of ports P1, P2, P3 and P4; an environment sensing system 20; a system coordination unit 30; an acoustic echo cancellation functionality 35, comprising an adder 40, an adaptation control functionality 100 and an acoustic echo estimation functionality 110; a time to frequency domain conversion functionality 50; a frequency domain processing functionality 60; a comfort noise generation functionality 62; a frequency to time domain conversion functionality 70; a pair of switchable attenuation functionalities 80A and 80B; and an echo path change detection functionality 115. FIG. 1B illustrates a high level block diagram of a detailed embodiment of environment sensing system 20. Particularly, environment sensing system 20 comprises: a near-end saturation detection functionality 120; a speaker saturation detection functionality 130; a convergence detection functionality 140; a divergence detection functionality 150; a far-end narrow band signal detection functionality 160; a near-end narrow band signal detection functionality 170; a near-end speech detection functionality 180; a far-end silence detection functionality 190; and an output module 200. The structure of FIGS. 1A-1B will be described together.

Each of system coordination unit 30; acoustic echo cancellation functionality 35; an adder 40; adaptation control functionality 100; acoustic echo estimation functionality 110; time to frequency domain conversion functionality 50; frequency domain processing functionality 60; comfort noise generation functionality 62; frequency to time domain conversion functionality 70; switchable attenuation functionalities 80A and 80B; echo path change detection functionality 115; near-end saturation detection functionality 120; speaker saturation detection functionality 130; convergence detection functionality 140; divergence detection functionality 150; far-end narrow band signal detection functionality 160; near-end narrow band signal detection functionality 170; near-end speech detection functionality 180; far-end silence detection functionality 190; and output module 200 may be implemented in dedicated hardware, such as an ASIC, or by a microprocessor or microcontroller executing electronically readable instructions stored on an associated memory.

Port P1 is coupled to a speaker input system 210, such as a microphone system, a positive input of adder 40, an input of echo path change detection functionality 115, an input of near-end saturation detection functionality 120, an input of convergence detection functionality 140, an input of divergence detection functionality 150, an input of near-end narrow band signal detection functionality 170, an input of near-end speech detection functionality 180 and an input of far-end silence detection functionality 190, the signal at the node denoted SIN.

A negative input of adder 40 is coupled to an output of acoustic echo estimation functionality 110, an input of divergence detection functionality 150 and input of far-end silence detection functionality 190, the signal at the node denoted YHAT. The output of adder 40, i.e. the output of acoustic echo cancellation functionality 35, is coupled to an input of convergence detection functionality 140, an input of divergence detection functionality 150, an input of adaptation control functionality 100, a respective input of time to frequency domain conversion functionality 50 and a respective input of echo path change detection functionality 115, the signal at the node denoted ERROR.

An output of time to frequency domain conversion functionality 50 is coupled to a respective input of frequency domain processing functionality 60 and a respective output of frequency domain processing functionality 60 is coupled to an input of frequency to time domain conversion functionality 70. An input of comfort noise generation functionality 62 is coupled to a respective output of frequency domain processing functionality 60 and an output of comfort noise generation functionality 62 is coupled to a respective input of frequency domain processing functionality 60. An output of frequency to time domain conversion functionality 70 is coupled to an input of switchable attenuation functionality 80A and an output of switchable attenuation functionality 80A is coupled to port P2, the signal at port P2 denoted S OUT.

Figure 1C:
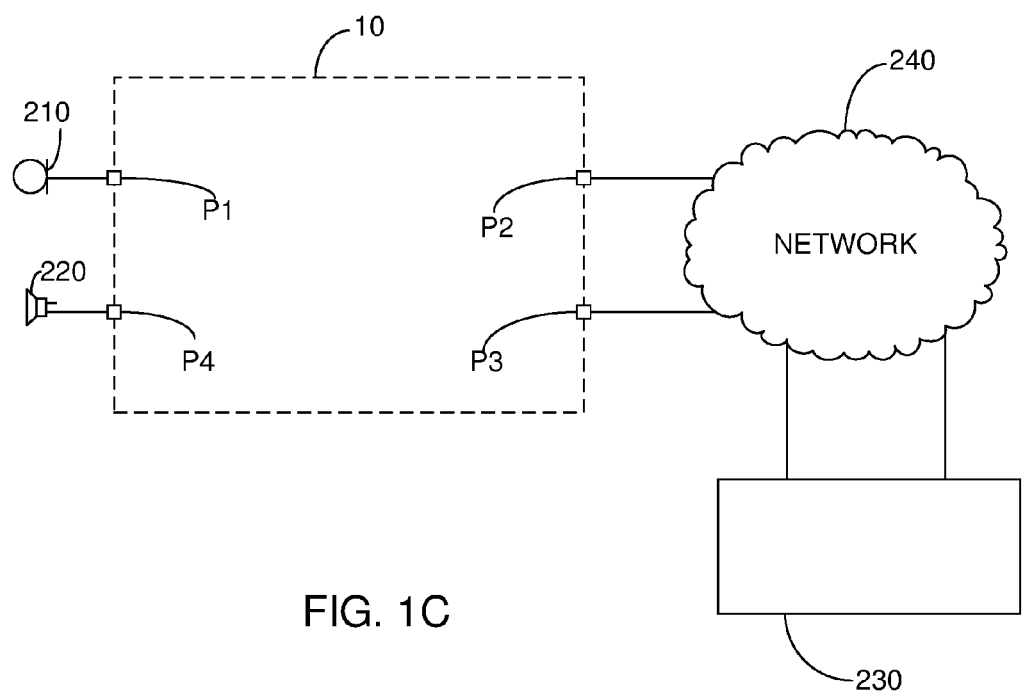

Port P3 is coupled to an input of switchable attenuation functionality 80B and an input of time to frequency domain conversion functionality 50, the signal at port P3 denoted RIN. An output of switchable attenuation functionality 80B is coupled to an input of acoustic echo estimation functionality 110, an input of speaker saturation detection functionality 130, an input of far-end narrow band signal detection functionality 160, an input of far-end silence detection functionality 190, a respective input of echo path change detection functionality 115 and a speaker output system 220 via port P4, the signal at the node denoted ROUT. As illustrated in FIG. 1C, ports P2 and P3 are further in communication with a far-end communication device 230, via a communication network 240. In one embodiment, communication network 240 is one of a telephone network and the Internet.

An output of echo path change detection functionality 115 is coupled to a respective input of system coordination unit 30. An output of each of near-end saturation detection functionality 120, speaker saturation detection functionality 130, convergence detection functionality 140, divergence detection functionality 150, far-end narrow band signal detection functionality 160, near-end narrow band signal detection functionality 170, near-end speech detection functionality 180 and far-end silence detection functionality 190 is coupled to a respective input of system coordination unit 30, via output module 200. A respective input of each of adaptation control functionality 100, frequency domain processing functionality 60, comfort noise generation functionality 62 and switchable attenuation functionalities 80A and 80B is coupled to a respective output of system coordination unit 30.

Acoustic echo cancellation functionality 35 is illustrated and described herein as being separate from frequency domain processing functionality 60, however this is not meant to be limiting in any way. In another embodiment (not shown), acoustic echo cancellation functionality 35 is implemented as part of frequency domain processing functionality 60. Each of switchable attenuation functionalities 80A and 80B comprise a selectable plurality of attenuation levels. Particularly, in one embodiment, switchable attenuation functionality 80A exhibits a high attenuation level of greater than 3 dB and a low attenuation level of less than 3 dB. In another embodiment, switchable attenuation functionality 80B exhibits a high attenuation level of greater than 1 dB and a low attenuation level of less than 1 dB.

The operation of FIGS. 1A-1C will be described together. In operation, a near-end signal SIN, i.e. a signal representing acoustic sounds received by speaker input system 210, is received at port P1, optionally after application of beamforming filters. Additionally, a far-end signal RIN, i.e. a signal representing acoustic sounds received at communication device 230, is received at port P3. Signal SIN is arranged to be processed into a signal SOUT and transmitted to far-end communication device 230. Particularly, as will be described below, signal ERROR represents signal SIN after acoustic echo cancellation. Signal ERROR is converted to the frequency domain by time to frequency domain conversion functionality 50 and processed by frequency domain processing functionality 60. The processed signal is then converted back to the time domain by frequency to time domain conversion functionality 70. The converted signal is then attenuated as necessary by switchable attenuation functionality 80A, as will be described below, and output as signal SOUT. Signal RIN is arranged to be processed into a signal ROUT, as will be described below, signal ROUT being output to speaker output system 220. Near-end saturation detection functionality 120 is arranged to determine if the amplitude of signal SIN exceeds a maximum allowed value. If the sounds are too strong, full duplex voice communication system 10 will not be able to analyze them properly. Similarly, speaker saturation detection functionality 130 is arranged to determine if the amplitude of signal ROUT exceeds a maximum allowed value for speaker output system 220.

Convergence detection functionality 140 is arranged, as described above, to receive signals SIN and ERROR, i.e. the signal at the output of adder 40. Particularly, acoustic echo estimation functionality 110 is arranged to output an estimation of an echo from signal RIN within signal SIN, denoted above signal YHAT, and adder 40 is arranged to subtract echo estimation YHAT from signal SIN. As described above, signal RIN is received from far-end voice communication system 230 and is output at speaker output system 220. The output sounds can be picked up at speaker input system 210 as an echo and degrade the speech received at speaker input system 210. In the event that echo estimation YHAT is accurate, signal ERROR will contain only the near-end sounds from the vicinity of speaker input system 210 and substantially no echo from the sounds output at speaker output system 220. Convergence detection functionality 140 is arranged to compare signals SIN and ERROR and determine whether acoustic echo estimation functionality 110 was successful in the echo estimation, i.e. that the echo cancellation algorithm has converged to an optimal solution, as known to those skilled in the art at the time of the invention.

As described above, divergence detection functionality 150 is arranged to receive signals, SIN, ERROR and YHAT, and determine whether acoustic echo estimation functionality 110 was unsuccessful in the echo estimation, i.e. that the echo cancellation algorithm has diverged from the optimal solution, as known to those skilled in the art at the time of the invention. In one embodiment, convergence detection functionality 140 is arranged to analyze signals SIN and ERROR for a longer period than divergence detection functionality 150. As a result, convergence detection functionality 140 is slower but more accurate. In another embodiment (not shown), divergence detection functionality 150 is not provided and convergence detection functionality 140 is arranged to determine whether the acoustic echo estimation algorithm has converged with, or diverged from, the optimal solution.

Far-end narrow band signal detection functionality 160 is arranged to detect within signal ROUT representations of single tones of sound exhibiting frequencies of less than 8 kHz. Similarly, near-end narrow band signal detection functionality 170 is arranged to detect within signal SIN representations of single tones of sound exhibiting frequencies of less than 8 kHz.

Near-end speech detection functionality 180 is arranged to detect whether there is speech within signal SIN, responsive to a voice activity detection (VAD) algorithm. Far-end silence detection functionality 190 is arranged to detect whether signal ROUT represents silence or sounds. The detection of sound within signal ROUT is further responsive to analyzation of signals SIN and YHAT which contain echoes of signal ROUT.

As described above, system coordination unit 30 is arranged to receive the outputs of near-end saturation detection functionality 120, speaker saturation detection functionality 130, convergence detection functionality 140, divergence detection functionality 150, far-end narrow band signal detection functionality 160, near-end narrow band detection functionality 170, near-end speech detection functionality 180 and far-end silence detection functionality 190.

Responsive to detection of a saturated signal SIN by near-end saturation detection functionality 120 or detection of a saturated signal ROUT by speaker saturation detection functionality 130, system coordination unit 30 is arranged to control adaptation control functionality 100 to disable the adaptation of acoustic echo estimation functionality 110, i.e. the update of the echo estimate. Particularly, acoustic echo estimation functionality 110 is arranged to constantly update the estimation of the echo within signal SIN, however a non-linear saturated signal may degrade the echo estimation. By disabling the echo estimate update, the saturated signal won't interfere with future echo estimation. Once near-end saturation detection functionality 120 and/or far-end saturation detection functionality 130 cease to detect a saturated signal, system coordination unit 30 is arranged to control adaptation control functionality to resume the adaptation of acoustic echo estimation functionality 110, adaptation control functionality 100 arranged to control the acoustic echo estimation of acoustic echo estimation functionality 110 responsive to signal ERROR, as known to those skilled in the art at the time of the invention.

Additionally, in one embodiment, responsive to detection of a saturated signal SIN, system coordination unit 30 is arranged to control switchable attenuation functionality 80A to attenuate the signal to be output by a maximum attenuation level, thereby outputting a cleaner signal FOUT to the far-end communication device.

In the event that arbitrary tones are present in either or both of signals ROUT and SIN, the acoustic echo estimation of acoustic echo estimation functionality 110 may be degraded by the arbitrary tones. Responsive to detection of single tones within signal ROUT by far-end narrow band signal detection functionality 160 and/or detection of single tones within signal SIN by near-end narrow band signal detection functionality 170, system coordination unit 30 is arranged to control adaptation control functionality 100 to disable the adaptation of acoustic echo estimation functionality 110, i.e. the update of the echo estimate, as described above.

Responsive to a determination by convergence detection functionality 140 that the acoustic echo estimation algorithm has converged with the optimal solution, system coordination unit 30 is arranged to further determine the state of the present communication. Particularly, responsive to the outputs of near-end speech detection functionality 180 and far-end silence detection functionality 190, system coordination unit 30 is arranged to determine whether there is no speech present within either of signals ROUT and SIN, there is speech present within both of signals ROUT and SIN (double talk), whether there is speech present within signal SIN but not within signal ROUT (near-end speech only) or there is speech present within signal ROUT but not within signal SIN (far-end speech only). As described above, near-end speech is detected responsive to a voice activity detection algorithm, while far-end speech is detected without a voice activity detection algorithm. As a result, detection of far-end speech includes detection of noise on signal ROUT.

Responsive to the detected speech state, system coordination unit 30 is arranged to control adaptation control functionality 100, frequency domain processing functionality 60 and switchable attenuation functionalities 80A and 80B in a number of states.

Acoustic echo estimation functionality 110 is arranged, responsive to adaptation control functionality 100, to operate in one of three modes: a normal speed mode, i.e. a steady state mode; a high speed mode; and a non-adaptive mode. Specifically, in the normal speed mode, acoustic echo estimation functionality 110 is arranged to continuously update the acoustic echo estimation in accordance with minor echo changes, based on the converged echo estimation, as known to those skilled in the art at the time of the invention. In the normal speed mode, the acoustic echo estimation update is slower but more accurate. In the high speed mode, acoustic echo estimation functionality 110 is arranged to update the acoustic echo estimation at a faster speed than in the normal speed mode, however the estimation is less accurate. In the non-adaptive mode, acoustic echo estimation functionality 110 is arranged to not update the acoustic echo estimation, as described above. The normal speed mode is enabled when only far-end speech is detected and no change in echo path 230 is detected, as will be described below. The high speed mode is enabled when only far-end speech is detected and a change in echo path 230 is detected, as will be described below. In all other cases, the non-adaptation mode is enabled, as will be described below.

Frequency domain processing functionality 60 is arranged to apply low level residual echo attenuation when double talk is detected without a change in acoustic echo path 230 and when far-end speech is detected with or without a change in acoustic echo path 230. Frequency domain processing functionality 60 is arranged to apply high level residual echo attenuation when double talk is detected with a change in acoustic echo path 230. Particularly, the frequency domain attenuation is implemented by an adaptive filter, which is active during periods of double talk and training during periods of far-end speech.

Switchable attenuation functionalities 80A and 80B are arranged to apply low level attenuation when double talk is detected with no change in acoustic echo path 230. Switchable attenuation functionalities 80A and 80B are arranged to apply high level attenuation when double talk or far-end speech are detected with a change in acoustic echo path 230.

In the event that system coordination unit 30 determines that there is no speech present in signal ROUT and no speech present in signal SIN, i.e. both far-end speech and near-end speech are absent, system coordination unit 30 is arranged to control adaptation control functionality 100 to operate in the non-adaptive mode. Due to the lack of speech in signal ROUT, there is no echo to cancel, therefore the acoustic echo adaptation is disabled. Disabling the acoustic echo adaptation when no echo is present will prevent unnecessary mistakes in the acoustic echo estimation.

Additionally, responsive to the determination that no speech is present in either of signals ROUT and SIN, system coordination unit 30 is arranged to control comfort noise generation functionality 62 to determine an estimation of background noise within signal SIN. As described above, in one embodiment a VAD algorithm is utilized by near-end speech detection functionality 180 to detect speech within signal SIN, the VAD algorithm allowing near-end speech detection functionality 180 to differentiate between speech and background noise. Particularly, time to frequency domain conversion functionality 50 is arranged to transform signal ERROR into frequency components, optionally responsive to a fast Fourier transform (FFT). As described above, signal ERROR comprises signal SIN after reduction of the echo estimation signal YHAT. Since there is silence within signal ROUT, no echo should be present and signal ERROR will be substantially identical to signal SIN. In one embodiment, the determination of the background noise estimation comprises updating a previously determined near-end background noise estimation. In another embodiment, the background noise estimation comprises autoregressive moving average (ARMA) filtering of each of the plurality of frequency components of signal ERROR. The background noise estimation continues as long as no speech is detected on either of signals SIN and ROUT.

In the event that system coordination unit 30 determines that there is speech present in signal ROUT, but no speech present in signal SIN, i.e. there is far-end speech present but no near-end speech, system coordination unit 30 is arranged to control adaptation control functionality 100 to enable the update of the acoustic echo estimation by acoustic echo estimation functionality 110, in the above described normal speed mode. Additionally, frequency domain processing functionality 60 is arranged to apply a residual echo filter to attenuate residual echo within signal ERROR by a low attenuation value, optionally the low attenuation value of the residual echo filter being about 9-15 dB. Although there is no need to attenuate the echo in the signal, which is not being output, as described below, the adaptive residual echo filter is arranged to continue updating during the presence of far-end speech.

Since there is no speech from the vicinity of speaker input system 210, the only sounds within signal ERROR will be the background noise picked up by speaker input system 210 and any residual echo not cancelled by acoustic echo estimation functionality 110. It is therefore preferable to not transmit signal ERROR to the far-end communication device, thereby assuring that no echo will be heard by the far-end speaker. However, by doing so, the background noise around speaker input system 210, which is expected by the far-end speaker, will not be heard. From the perspective of the far-end speaker, this will sound like they are not speaking to anyone. In order to solve this problem, system coordination unit 30 is arranged to control frequency domain processing functionality 60 to pass to frequency to time domain conversion functionality 70 the output of comfort noise generation functionality 62 and not pass to frequency to time domain conversion functionality 70 the frequency components of signal ERROR. As a result, the residual echo is not transmitted to communication device 230 within signal SOUT, while the background noise estimation is transmitted. In one embodiment, comfort noise generation functionality 62 is arranged to modulate white noise FFT coefficients by the estimated background noise, the modulated white noise FFT coefficients being output to frequency to time domain conversion functionality 70 and comfort noise is thus transmitted to the far-end.

System coordination unit is further arranged to control switchable attenuation functionality 80A to not attenuate the output of frequency to time domain conversion functionality 70 and control switchable attenuation functionality 80B to not attenuate signal RIN. No echo will be present in signal SIN since there is no speech in signal RIN, therefore attenuation of signal RIN is unnecessary. Similarly, any echo present in signal SIN is cut off by frequency domain processing functionality 60, therefore attenuation of signal ERROR is unnecessary.

In the event that system coordination unit 30 determines that there is speech present in signal SIN, but no speech present in signal ROUT, i.e. there is near-end speech present but no far-end speech present, system coordination unit 30 is arranged to control adaptation control functionality 100 to disable the update of the acoustic echo estimation by acoustic echo estimation functionality 110. System coordination unit is further arranged to control switchable attenuation functionality 80A to not attenuate the output of frequency to time domain conversion functionality 70 and control switchable attenuation functionality 80B to not attenuate signal RIN. No echo will be present in signal SIN since there is no speech in signal RIN, therefore attenuation is unnecessary.

In the event that system coordination unit 30 determines that there is speech present in both signals SIN and ROUT, i.e. there is double-talk present, system coordination unit 30 is arranged to control adaptation control functionality 100 to disable the update of the acoustic echo estimation by acoustic echo estimation functionality 110 since the adaptation of acoustic echo estimation functionality 110 will not be accurate because of the double talk. System coordination unit 30 is further arranged to: control switchable attenuation functionality 80A to attenuate the output of frequency to time domain conversion functionality 70 by a low attenuation value; and control switchable attenuation functionality 80B to attenuate signal RIN by a low attenuation value. In one embodiment, as described above, the low level value of each of switchable attenuation functionalities 80A and 80B is less than 3 dB. The attenuation of switchable attenuation functionality 80B attenuates the far-end speech thereby reducing the amount of echo received by speaker input system 210. The attenuation of switchable attenuation functionality 80A attenuates the near-end speech, and as a result further attenuates any residual echo mixed with the near-end speech. The double attenuation by switchable attenuation functionalities 80A and 80B reduces the amplitude of the echo to a level which will be less heard at far-end communication device 230, thereby providing compensation for the non-adaptation state of acoustic echo estimation functionality 110. Additionally, frequency domain processing functionality 60 is arranged to apply the low level attenuation of the residual echo filter to attenuate residual echo within signal ERROR, as described above.

The echo of signal ROUT travels from speaker output system 220 to speaker input system 210 along an acoustic echo path 230. In the event that there is a change in acoustic echo path 230, such as when someone waves his hand in front of speaker input system 210 and/or speaker output system 220, the normal speed mode of acoustic echo estimation functionality 110 is unable to properly estimate the acoustic echo. As will be described further below, echo path change detection functionality 115 is arranged to analyze signals ERROR, SIN and ROUT to determine whether there has been a change in acoustic echo path 230. In one embodiment, as will be described below, echo path change detection functionality 115 is arranged to perform a time domain analysis of signals SIN and ERROR and a frequency domain analysis of signals ERROR and ROUT.

In the event that echo path change detection functionality 115 detects a change in echo path 230 and system coordination unit 30 detects that that there is speech present in signal ROUT but no speech present in signal SIN, i.e. there is far-end speech present but no near-end speech, system coordination unit 30 is arranged to control adaptation control functionality 100 to enable the update of the acoustic echo estimation by acoustic echo estimation functionality 110 in the high speed mode. Particularly, as described above, acoustic echo estimation functionality 110 is arranged in the high speed mode to adapt faster to changes in the echo, which are significant due to the change in acoustic echo path 230.

Additionally, responsive to the detected acoustic echo path 230 change and far-end speech, system coordination unit 30 is further arranged to control switchable attenuation functionality 80A to attenuate the output of frequency to time domain conversion functionality 70 by a high attenuation value. Similarly, system coordination unit 30 is further arranged to control switchable attenuation functionality 80B to attenuate signal RIN by a high attenuation value. In one embodiment, as described above, the high attenuation values of switchable attenuation functionalities 80A and 80B are greater than 3 dB and 1 dB, respectively. Furthermore, frequency domain processing functionality 60 is arranged to apply the residual echo filter to attenuate residual echo within signal ERROR at the low level, as described above.

In the event that echo path change detection functionality 115 detects a change in echo path 230 and system coordination unit 30 detects that that there is speech present in both signals ROUT and SIN, i.e. there is double talk present, system coordination unit 30 is arranged to control adaptation control functionality 100 to disable the update of the acoustic echo estimation by acoustic echo estimation functionality 110 due to the double talk, as described above.

Additionally, responsive to the detected acoustic echo path 230 change and double talk, system coordination unit 30 is further arranged to control switchable attenuation functionality 80A to attenuate the output of frequency to time domain conversion functionality 70 by the high attenuation level, as described above. Similarly, system coordination unit 30 is further arranged to control switchable attenuation functionality 80B to attenuate signal RIN by a high attenuation value, as described above. Furthermore, frequency domain processing functionality 60 is arranged to apply the residual echo filter to attenuate residual echo within signal ERROR by a high attenuation value.

In summary, when convergence detection functionality 140 detects that acoustic echo estimation functionality 110 has converged to the optimal solution, system coordination unit 30 is arranged to control adaptation control functionality 100, frequency domain processing functionality 60 and switchable attenuation functionalities 80A and 80B in a number of states, as follows:

1. In the presence of double talk, the acoustic echo estimation adaptation is disabled, the frequency domain residual echo filter is activated at a low level and the time domain signals being received from the far-end and transmitted to the far-end are attenuated by a low attenuation value;
2. In the presence of only far-end speech and a change in the near-end acoustic echo path, the acoustic echo estimation adaptation is enabled in a high speed mode, the frequency domain residual echo filter is activated at a low level and the time domain signals being receive from the far-end and transmitted to the far-end are attenuated by a high attenuation value; and
3. In the presence of double talk and a change in the near-end acoustic echo path, the acoustic echo estimation adaptation is disabled, the frequency domain residual echo filter is activated at a high level and the time domain signals being received from the far-end and transmitted to the far-end are attenuated by a high attenuation value.

Additionally, when convergence detection functionality 140 detects that acoustic echo estimation functionality 110 has converged to the optimal solution, system coordination unit 30 is further arranged to control adaptation control functionality 100, frequency domain processing functionality 60 and switchable attenuation functionalities 80A and 80B in a number of optional states, as follows:

1. In the absence of speech from both the near-end and far-end, the acoustic echo estimation adaptation is disabled and an estimation of near-end background noise is determined;
2. In the presence of only near-end speech, the acoustic echo estimation adaptation is disabled; and
3. In the presence of only far-end speech, the acoustic echo estimation adaptation is enabled in a normal speed mode, the frequency domain residual echo filter is activated at a low level and comfort noise is transmitted to the far-end speaker instead of the near-end background noise.

In the event that divergence detection functionality 150 detects that acoustic echo estimation functionality 110 has diverged from the optimal solution by a predetermined margin, system coordination unit 30 is arranged to control adaptation control functionality 100 to control acoustic echo estimation functionality 110 to operate in the high speed mode described above, regardless of the outputs of near-end speech detection functionality 180 and far-end silence detection functionality 190.

Figure 2A:
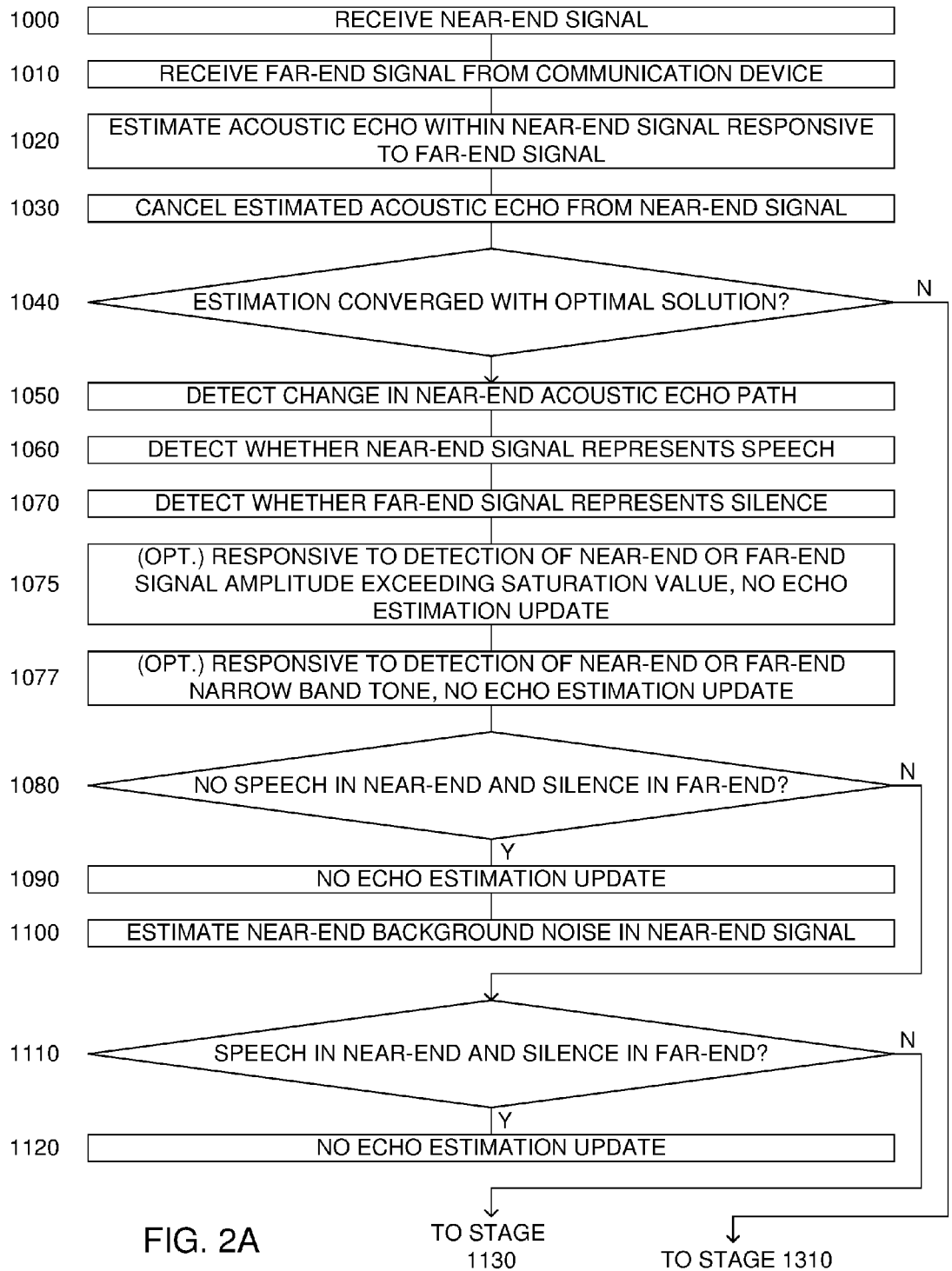
FIGS. 2A-2C illustrate a high level flow chart of a first full duplex voice communication method, according to certain embodiments.
Figure 2B:
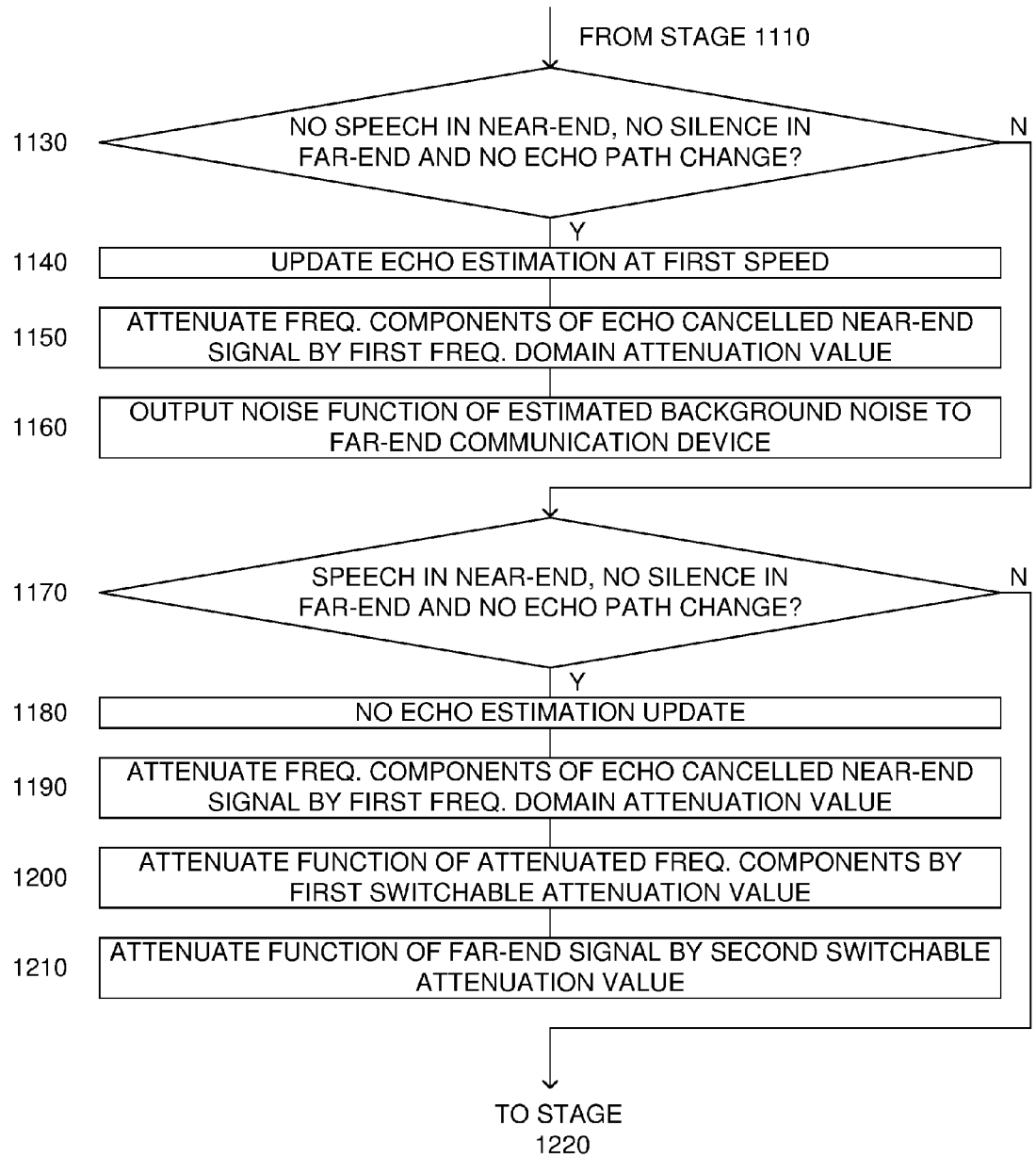
Figure 2C:
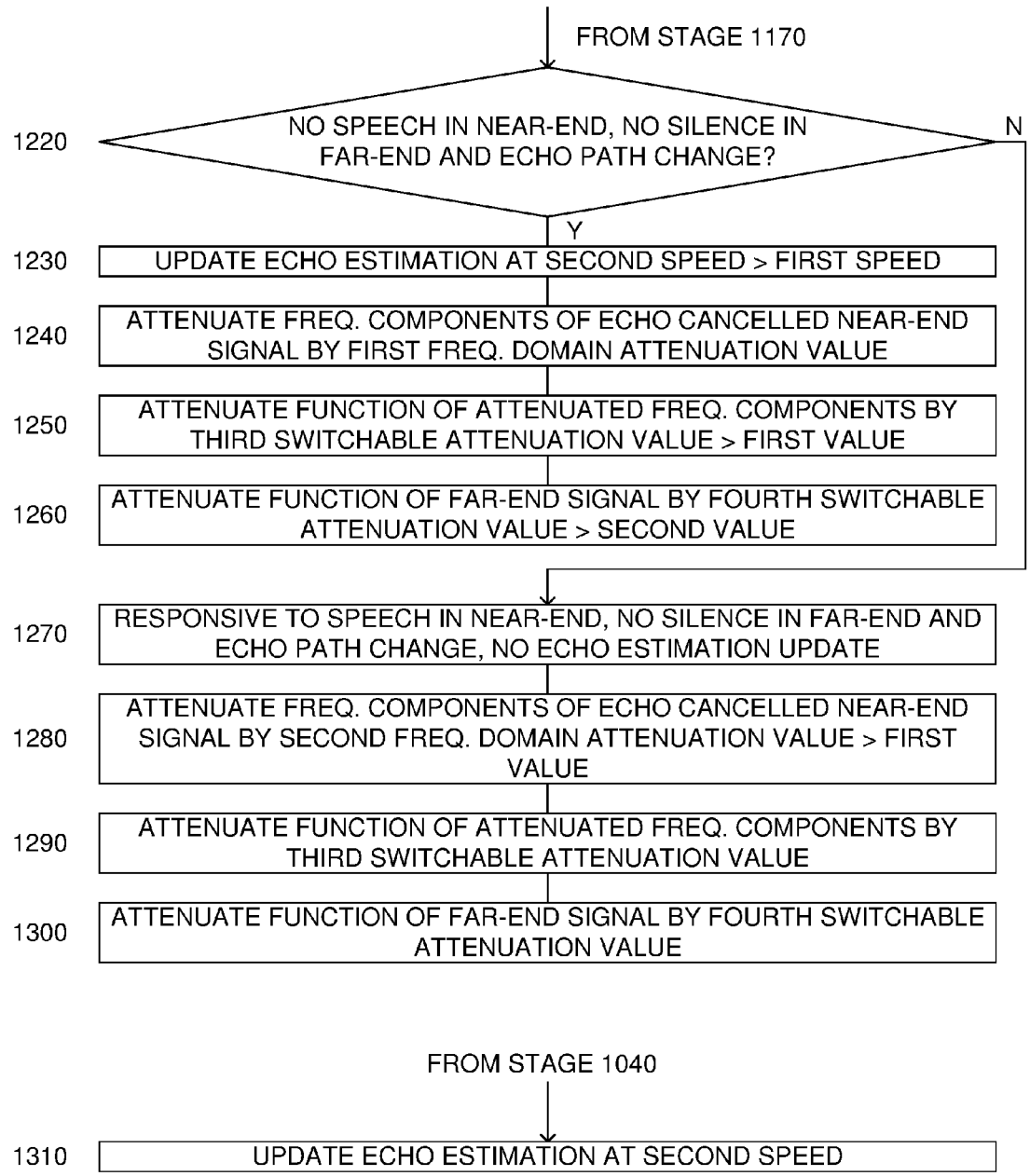

FIGS. 2A-2C illustrate a high level flow chart of a full duplex voice communication method, according to certain embodiments, FIGS. 2A-2C being described together. In stage 1000, a near-end signal is received. As described above, the near-end signal represents acoustic sounds picked up by a near-end speaker input system, such as a microphone. In stage 1010, a far-end signal is received from a far-end communication device. As described above, the far-end signal represents acoustic sounds picked up by the far-end communication device.

In stage 1020, responsive to the received far-end signal of stage 1010, an acoustic echo within the received near-end signal of stage 1000 is estimated. In stage 1030, the estimated acoustic echo of stage 1020 is cancelled from the received near-end signal.

In stage 1040, the estimated acoustic echo of stage 1020 is analyzed to determine whether the estimation has converged with an optimal solution. In the event that the estimated acoustic echo has converged with the optimal solution, in stage 1050 a change in a near-end acoustic echo path is detected. In stage 1060, the received near-end signal of stage 1000 is analyzed to determine whether it represents speech. In stage 1070, the received far-end signal of stage 1010 is analyzed to determine whether it represents silence. As described above, in one embodiment far-end speech is considered present when no silence is detected even though it may be noise and not speech.

In optional stage 1075, the amplitude of the received near-end signal of stage 1000 and the amplitude of the received far-end signal of stage 1010 is detected. In the event that the amplitude of one, or both, of the near-end and far-end signals exceed a respective saturation value, the acoustic echo estimation of stage 1020 is no longer updated until both amplitudes are below the respective saturation values.

In optional stage 1077, the received near-end signal of stage 1000 and the received far-end signal of stage 1010 are analyzed to determine whether representations of non-speech narrow band tones, exhibiting a frequency below 8 kHz, are present therein. In the event that representations of one or more narrow-band tones are present in one, or both, of the near-end and far-end signals, the acoustic echo estimation of stage 1020 is no longer updated until narrow band tones are no longer detected.

In stage 1080, the received near-end signal of stage 1000 and the received far-end signal of stage 1010 are analyzed. In the event that no speech is detected within the received near-end signal, i.e. there is either silence or noise, and silence is detected within the received far-end signal, in stage 1090 the acoustic echo estimation of stage 1020 is no longer updated. Additionally, in stage 1100 the near-end background noise within the received near-end signal of stage 1000 is estimated.

In the event that in stage 1080 the condition of no speech in the received near-end signal of stage 1000 and silence in the received far-end signal of stage 1010 is not met, in stage 1110 the near-end and far-end signals are analyzed. Although the analysis of stage 1110 is described herein as being performed after the aanalysis of stage 1080, this is not meant to be limiting in any way and the analysis of stages 1080 and 1110, and stages 1130, 1170, 1220 and 1270 described below, are in one embodiment performed in parallel. In the event that speech is detected within the received near-end signal and silence is detected within the received far-end signal, in stage 1120 the acoustic echo estimation of stage 1020 is no longer updated.

In the event that in stage 1110 the condition of speech in the received near-end signal of stage 1000 and silence in the received far-end signal of stage 1010 is not met, in stage 1130 the near-end and far-end signals, and the near-end acoustic echo path change detection of stage 1050 are analyzed. In the event that no speech is detected within the received near-end signal, no silence is detected within the received far-end signal and no near-end acoustic echo path change has been detected, in stage 1140 the acoustic echo estimation of stage 1020 is updated at a first speed. Additionally, in stage 1150 frequency components of the echo cancelled near-end signal of stage 1030 are attenuated by a first frequency domain attenuation value. Furthermore, in stage 1160 a noise function of the estimated near-end background noise of stage 1100 is output to the far-end communication device of stage 1010.

In the event that in stage 1130 the condition of no speech in the received near-end signal of stage 1000, no silence in the received far-end signal of stage 1010 and no near-end acoustic echo path change of stage 1050 is not met, in stage 1170 the near-end and far-end signals, and the near-end acoustic echo path change detection are analyzed. In the event that speech is detected within the received near-end signal, no silence is detected within the received far-end signal and no near-end acoustic echo path change has been detected, in stage 1180 the acoustic echo estimation of stage 1020 is no longer updated, due to the double talk. Additionally, in stage 1190 the frequency components of the echo cancelled near-end signal of stage 1030 are attenuated by the first frequency domain attenuation value, as described above in relation to stage 1150. Furthermore, in stage 1200 a first function of the attenuated frequency components of stage 1190 are attenuated by a first switchable attenuation value, optionally in the time domain. Similarly, in stage 1210 a second function of the received far-end signal of stage 1010 is attenuated by a second switchable attenuation value, optionally in the time domain.

In the event that in stage 1170 the condition of speech in the received near-end signal of stage 1000, no silence in the received far-end signal of stage 1010 and no near-end acoustic echo path change of stage 1050 is not met, in stage 1220 the near-end and far-end signals, and the near-end acoustic echo path change detection are analyzed. In the event that no speech is detected within the received near-end signal, no silence is detected within the received far-end signal and a near-end acoustic echo path change has been detected, in stage 1230 the acoustic echo estimation of stage 1020 is updated at a second speed, the second speed greater than the first speed of stage 1140. Additionally, in stage 1240 the frequency components of the echo cancelled near-end signal of stage 1030 are attenuated by the first frequency domain attenuation value, as described above in relation to stage 1150. Furthermore, in stage 1250 a first function of the attenuated frequency components of stage 1190 are attenuated by a third switchable attenuation value, optionally in the time domain. The third switchable attenuation value is greater than the first switchable attenuation value of stage 1200. Similarly, in stage 1260 a second function of the received far-end signal of stage 1010 is attenuated by a fourth switchable attenuation value, optionally in the time domain, the fourth switchable attenuation value greater than the second switchable attenuation value of stage 1210.

In the event that in stage 1220 the condition of no speech in the received near-end signal of stage 1000, no silence in the received far-end signal of stage 1010 and a near-end acoustic echo path change of stage 1050 is not met, in stage 1270 the near-end and far-end signals, and the near-end acoustic echo path change detection are analyzed. In the event that speech is detected within the received near-end signal, no silence is detected within the received far-end signal and a near-end acoustic echo path change has been detected, the acoustic echo estimation of stage 1020 is no longer updated, due to the double talk. Additionally, in stage 1280 the frequency components of the echo cancelled near-end signal of stage 1030 are attenuated by a second frequency domain attenuation value, the second frequency domain attenuation value greater than the first frequency domain attenuation value of stage 1150. Furthermore, in stage 1290 a first function of the attenuated frequency components of stage 1190 are attenuated by the third switchable attenuation value, as described above in relation to stage 1250. Similarly, in stage 1300 a second function of the received far-end signal of stage 1010 is attenuated by the fourth switchable attenuation value, as described above in relation stage 1260.

In the event that in stage 1040, described above, it is determined that the acoustic echo estimation of stage 1020 has not converged with the optimal solution, in stage 1310 the acoustic echo estimation of stage 1020 is updated at a second speed, as described above in relation to stage 1230.

Figure 2D:
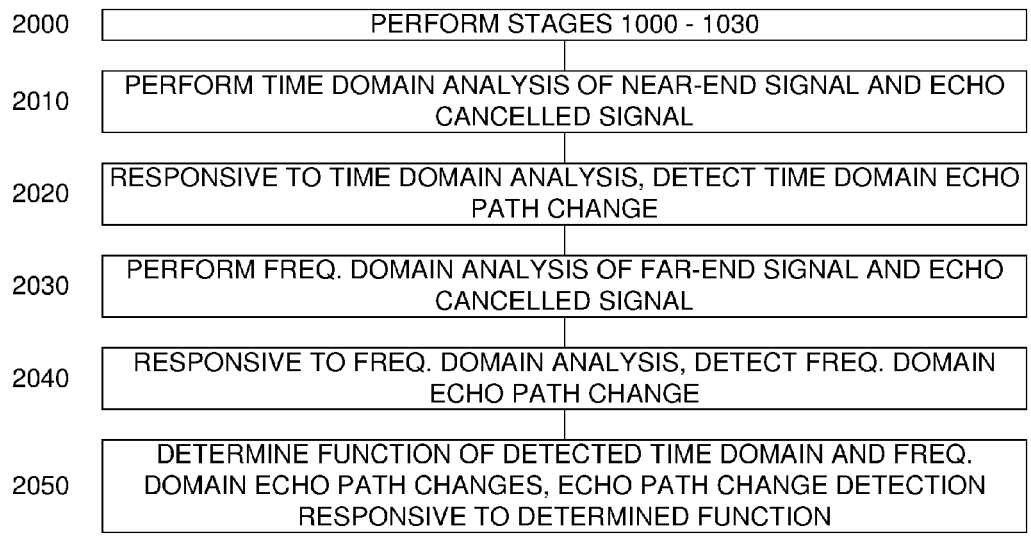
FIG. 2D illustrates a high level flow chart of an acoustic echo path change detection method, according to certain embodiments.

FIG. 2D illustrates a high level flow chart of a method of detecting a change in a near-end acoustic echo path, according to certain embodiments. Particularly, FIG. 2D describes a detailed method of performing the near-end acoustic echo path change detection of stage 1050. In stage 2000, stages 1000-1030, as described above, are performed. In stage 2010, a time domain analysis is performed on the received near-end signal of stage 1000 and on the acoustic echo cancelled signal of stage 1030. In one embodiment, the time domain analysis comprises a determination of a cross-correlation of a function of the received near-end signal and a function of the acoustic echo cancelled signal. Optionally, the function of each of the received near-end signal and the acoustic echo cancelled signal comprises an auto-regressive moving average. In stage 2020, responsive to the time domain analysis of stage 2010, an indication of a change in the near-end acoustic echo path is detected. In one embodiment, the cross correlation value of stage 2010 is compared to a predetermined threshold value, and in the event that the cross correlation value is greater than the threshold value the indication of an acoustic echo path change is output.

In stage 2030, a frequency domain analysis of the received far-end signal of stage 1010 and of the acoustic echo cancelled signal of stage 1030 is performed. In one embodiment, an FFT spectrum of each of the far-end signal and acoustic echo cancelled signal is separated into a plurality of frequency sub-bands in accordance with the Bark scale. In one further embodiment, for each frequency sub-band, a cross power of the received far-end signal and acoustic echo cancelled signal is determined. Additionally, for each frequency sub-band, a difference between a function of the acoustic echo cancelled signal and a function of the determined cross power is determined, optionally the functions being auto-regressive moving averages. Further optionally, an auto-regressive moving average of the determined cross power is normalized with the averaged acoustic echo cancelled signal and with an auto-regressive moving average of the received far-end signal. In stage 2040, responsive to the frequency domain analysis of stage 2030, an indication of a change in the near-end acoustic echo path is detected. In one embodiment, the near-end acoustic echo path change detection is responsive to the number of frequency bands where the difference between the acoustic echo cancelled signal function and the cross power function is greater than a predetermined threshold value.

In stage 2050, a function of the determined near-end acoustic echo path change of stage 2020 and the determined near-end acoustic echo path change of stage 2040 is determined. In one embodiment the function is an OR function indicating that at least one of the time domain and frequency domain analyses has detected a change in the near-end acoustic echo path. The determined function is output to indicate whether there is in fact a change in the near-end acoustic echo path.

FIG. 2E illustrates a high level flow chart of a second full duplex voice communication method. In stage 3000, a near-end signal is received, the near-end signal representing sounds picked up by a microphone of a near-end communication device. In stage 3010, a far-end signal is received from a far-end communication device, the far-end signal representing sounds picked up by the far-end communication device. In stage 3020, the acoustic echo within the near-end signal of stage 3000 is estimated responsive to the far-end signal of stage 3010. In stage 3030, the estimated acoustic echo of stage 3020 is cancelled from the near-end signal of stage 3000.

In stage 3040, it is detected whether, or not, there is a change in a near-end acoustic echo path, i.e. the acoustic echo path between a speaker and the microphone of the near-end communication device of stage 3000. In stage 3050, it is detected whether, or not, the near-end signal of stage 3000 represents speech. In stage 3060, it is detected whether, or not, the far-end signal of stage 3010 represents silence.

In stage 3070, responsive to the acoustic echo path change detection of stage 3040, the near-end speech detection of stage 3050 and the far-end silence detection of stage 3060: frequency components of the acoustic echo cancelled near-end signal of stage 3030 are alternately attenuated by a first frequency domain attenuation value and by a second frequency domain attenuation value, the second frequency domain attenuation value greater than the first frequency domain attenuation value; a first function of the frequency component attenuated acoustic echo cancelled near-end signal is alternately attenuated by a first switchable attenuation value and by a second switchable attenuation value, the second switchable attenuation value greater than the first switchable attenuation value; and a second function of the far-end signal of stage 3010 is alternately attenuation by a third switchable attenuation value and by a fourth switchable attenuation value, the fourth switchable attenuation value greater than the third switchable attenuation value. Particularly, the first and second frequency domain attenuation values are utilized for attenuation in the frequency domain and the first, second, third and fourth switchable attenuation values are utilized for attenuation in the time domain.

In optional stage 3080, the attenuation of the frequency component attenuated acoustic echo cancelled near-end signal first function by the second switchable attenuation value of stage 3070 and the attenuation of the far-end signal second function by the fourth switchable attenuation value is responsive to detection of a change in the acoustic echo path of stage 3040.

In optional stage 3090, the attenuation of the frequency components of the echo cancelled near-end signal by the second frequency domain attenuation value of stage 3070 is responsive to a combination of all three of: detection of a change in the acoustic echo path of stage 3040; detection of stage 3050 that the near-end signal of stage 3000 represents speech; and detection of stage 3060 that the far-end signal of stage 3010 does not represent silence, i.e. the far-end signal represents speech or noise.

In optional stage 3100, responsive to the acoustic echo path change detection of stage 3040, the near-end speech detection of stage 3050 and the far-end silence detection of stage 3060, the acoustic echo estimation of stage 3020 is alternately: not updated; updated at a first speed; and updated at a second speed, the second speed greater than the first speed. Optionally, the acoustic echo estimation is updated at the second speed responsive to a combination of all three of: detection of a change in the acoustic echo path of stage 3040; detection of stage 3050 that the near-end signal of stage 3000 does not represent speech; and detection of stage 3060 that the far-end signal of stage 3010 does not represent silence.

Figure 3:
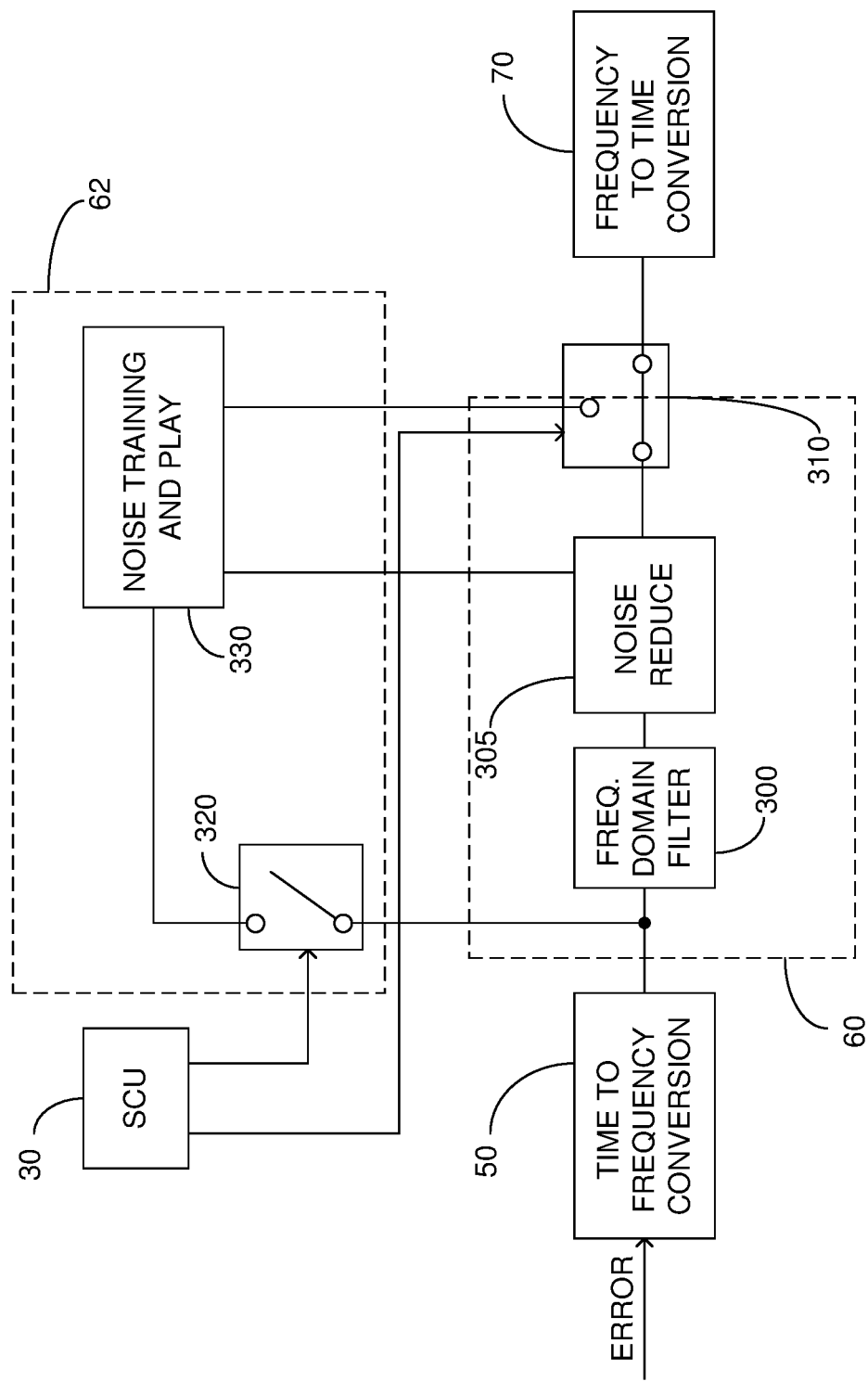
FIG. 3 illustrates a high level schematic diagram of a frequency domain processing functionality and comfort noise generation functionality, according to certain embodiments.

FIG. 3 illustrates a high level schematic diagram of a more detailed embodiment of frequency domain processing functionality 60 and comfort noise generation functionality 62 of full duplex voice communication system 10. Frequency domain processing functionality 60 comprises: a frequency domain filtering functionality 300 arranged to attenuate residual acoustic echo, as described above; a noise reduction functionality 305; and a controlled data path 310. Comfort noise generation functionality 62 comprises: a controlled data path 320; and a comfort noise train and play functionality 330.

A control input of each of controlled data path 310 and controlled data path 320 is coupled to a respective output of system coordination unit 30. A first terminal of controlled data path 320 is coupled to an output of time to frequency domain conversion functionality 50 and an input of frequency domain filtering functionality 300. A second terminal of controlled data path 320 is coupled to an input of comfort noise train and play functionality 330. A first output of comfort noise train and play functionality 330 is coupled to a first terminal of controlled data path 310 of frequency domain processing functionality 60 and a second output of comfort noise train and play functionality 330 is coupled to a respective input of noise reduction functionality 305. An output of frequency domain filtering functionality 300 is coupled to a respective input of noise reduction functionality 305 and an output of noise reduction functionality 305 is coupled to a second terminal of controlled data path 310. A third terminal of controlled data path 310 is coupled to an input of frequency to time domain conversion functionality 70.

In operation, as described above, responsive to a detection that no speech is present on the near-end signal SIN (not shown) and silence is present on the far-end signal ROUT (not shown), system coordination unit 30 is arranged to: control controlled data path 320 to couple the output of time to frequency domain conversion functionality 50 to the input of comfort noise train and play functionality 330; and control controlled data path 310 to couple the output of noise reduction functionality 305 to the input of frequency to time domain conversion functionality 70.

As further described above, during silence at both the near and far ends, comfort noise train and play functionality 330 is arranged to estimate the near-end background noise. Particularly, in one embodiment time to frequency domain conversion functionality 50 is arranged to convert signal ERROR to the frequency domain by performing an FFT thereon. The FFT coefficients are separated into frequency sub-bands, optionally in accordance with the Bark scale. Comfort noise train and play functionality 330 is arranged to filter the sub-band coefficients through an auto-regressive moving average (ARMA) filter. The averaged sub-band coefficients are used to update a previously stored estimate of the near-end background noise. As a result, any change in the near-end background noise is detected and the near-end background noise estimate is updated accordingly.

As described above, responsive to an indication that no speech activity is present in the near-end signal SIN and an indication that speech activity, or no silence, is present at the far-end signal ROUT, i.e. there is only far-end speech present, system coordination unit 30 is arranged to: control controlled data path 320 to decouple the output of time to frequency domain conversion functionality 50 from the input of comfort noise train and play functionality 330; and control controlled data path 310 to couple the input of frequency to time domain conversion functionality 70 to the output of comfort noise train and play functionality 330. As described above, in one embodiment comfort noise train and play functionality 330 is arranged to generate FFT white noise and modulate the white noise by the near-end background noise estimation. The modulated FFT white noise is converted by frequency to time domain conversion functionality 70 to the time domain, as described above. Thus, comfort noise is output to the far-end speaker instead of the near-end signal. As described above, the comfort noise is an estimation of the near-end background noise and does not include acoustic echo of the far-end signal. In one preferred embodiment, due to the increased accuracy of the near-end background noise estimation, the generated comfort noise is provided immediately and gradual application of the comfort noise is unnecessary.

Responsive to an indication that speech activity is present at the near end, system coordination unit 30 is arranged to: control controlled data path 320 to decouple the output of time to frequency domain conversion functionality 50 from the input of comfort noise train and play functionality 330; and control controlled data path 310 to couple the input of frequency to time domain conversion functionality 70 to the output of noise reduction functionality 305. Frequency domain filtering functionality 300 is arranged to remove residual echo from signal ERROR. Noise reduction functionality 305 arranged to reduce noise from signal ERROR. In one embodiment, the noise reduction of noise reduction functionality 305 is responsive to the near-end background noise estimation of comfort noise train and play functionality 330.

Figure 4A:
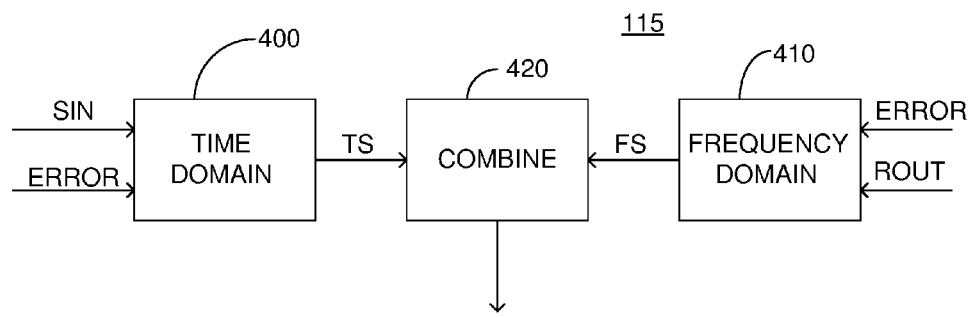
FIGS. 4A-4C illustrate various high level schematic diagrams of an acoustic echo path change detection functionality, according to certain embodiments.
Figure 4B:
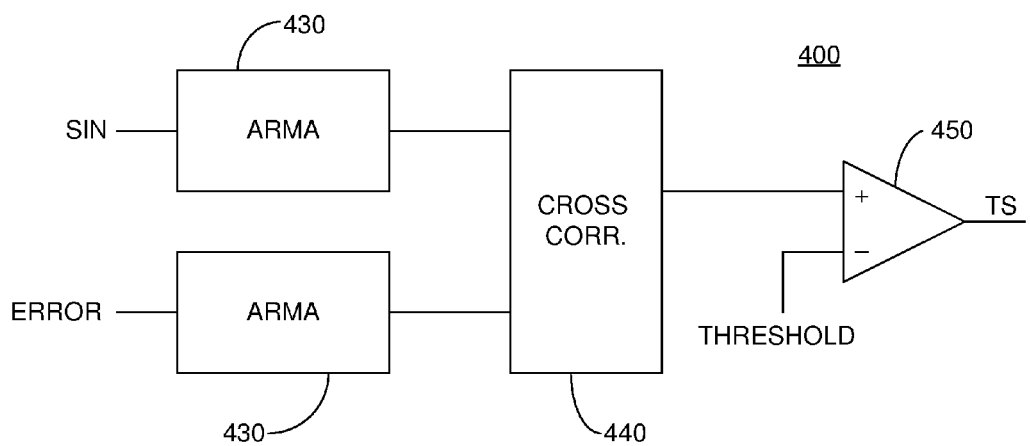
Figure 4C:
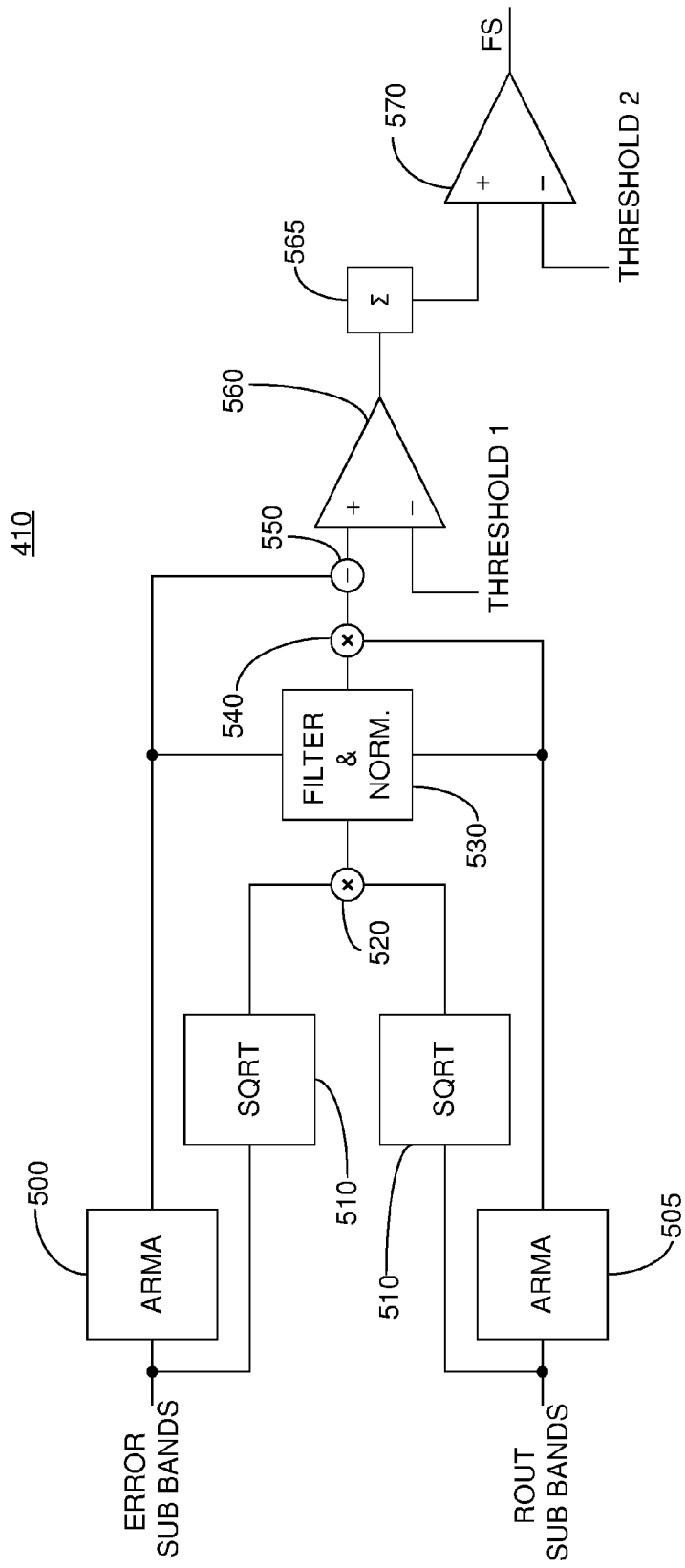

FIGS. 4A-4C illustrate high level schematic diagrams of a detailed embodiment of echo path change detection functionality 115 of full duplex voice communication system 10, FIGS. 4A-4C being described together. As illustrated in FIG. 4A, echo path change detection functionality 115 comprises: a time domain path change detection functionality 400; a frequency domain path change detection functionality 410; and a combination path change detection functionality 420.

As illustrated in FIG. 4B, time domain path change detection functionality 400 comprises: a pair of auto-regressive moving average (ARMA) filters 430; a cross correlation functionality 440; and a comparator 450. An input of each ARMA filter 430 is arranged to receive a respective one of signal SIN and signal ERROR. An output of each ARMA filter 430 is coupled to a respective input of cross correlation functionality 440 and an output of cross correlation functionality 440 is coupled to a first input of comparator 450. A second input of comparator 450 is arranged to receive a threshold value, denoted THRESHOLD. In one embodiment, the threshold value is arranged to be adjustable by a user. An output of comparator 450 is coupled to a respective input of combination path change detection functionality 420, the signal at the output denoted TS.

As illustrated in FIG. 4C, frequency domain path change detection functionality 410, comprises: an ARMA filter 500; an ARMA filter 505; a pair of square root functionalities 510; a multiplier 520; a filter and normalization functionality 530; a multiplier 540; a subtractor 550; a comparator 560; an accumulator 565; and a comparator 570. An input of ARMA filter 500 is arranged to receive sub-band powers of signal ERROR. In one embodiment (not shown), the sub-band powers of signal ERROR are received from time to frequency domain conversion functionality 50. An input of ARMA filter 505 is arranged to receive the sub-band powers of signal ROUT. In one embodiment (not shown), the sub-band powers of signal ROUT are received from time to frequency domain conversion functionality 50. Similarly, an input of each square root functionality 510 is arranged to receive the sub-band powers of a respective one of signals ROUT and ERROR.

The output of each square root functionality 510 is coupled to a respective input of multiplier 520. An output of multiplier 520 is coupled to a respective input of filter and normalization functionality 530. An output of each of ARMA filters 500 and 505 is coupled to a respective input of filter and normalization functionality 530. Additionally, the output of ARMA filter 500 is further coupled to a respective input of subtractor 550 and the output of ARMA filter 505 is further coupled to a respective input of multiplier 540. An output of filter and normalization functionality 530 is coupled to a respective input of multiplier 540 and an output of multiplier 540 is coupled to a respective input of subtractor 550. An output of subtractor 550 is coupled to a first input of comparator 560 and a second input of comparator 560 is arranged to receive a predetermined threshold value, denoted THRESHOLD 1. An output of comparator 560 is coupled to an input of accumulator 565. An output of accumulator 565 is coupled to a first input of comparator 570 and a second input of comparator 570 is arranged to receive a predetermined threshold value, denoted THRESHOLD 2. In one embodiment, predetermined thresholds THRESHOLD 1 and THRESHOLD 2 are each arranged to be adjusted by a user. An output of comparator 570 is coupled to a respective input of combination path change detection functionality 420, the signal at the output denoted FS.

In the event that there is a change in near-end acoustic echo path 230 (not shown), such as when the near-end speaker places his hand within near-end acoustic echo path 230, the time of travel and attenuation of the acoustically output signal ROUT along near-end acoustic echo path 230 will change. As a result, the acoustic echo estimate of acoustic echo estimation functionality 110 (not shown) will differ from the actual echo. Time domain path change detection functionality 400 is arranged to receive signals SIN and ERROR, and detect a change in near-end acoustic echo path 230 responsive to a time domain analysis of the received signals. Particularly, signals SIN and ERROR are each filtered by the respective ARMA filter 430. Cross correlation functionality 440 is arranged to determine a cross correlation metric of the averaged signals. The determined cross correlation metric is compared to value THRESHOLD by comparator 450. In the event that there is significant echo on signal ERROR, the similarity between signal ERROR and signal SIN will be higher than value THRESHOLD and comparator 450 will output a high signal TS. In the event that the echo on signal ERROR was successfully cancelled, the similarity between signal ERROR and signal SIN will be lower than value THRESHOLD and comparator 450 will output a low signal TS. Thus, responsive to a change in near-end acoustic echo path 230, comparator 450 will rapidly output a high signal TS indicating that there was a change in acoustic echo path 450.

Determining a cross-correlation is very fast and therefore time domain path change detection functionality 400 provides a rapid detection of a change in near-end acoustic echo path 230.

Frequency domain path change functionality 410 is arranged to perform a frequency domain analysis on signals ERROR and ROUT to detect a change in near-end acoustic echo path 230. Square root functionalities 510 and multiplier 520 are arranged to determine a cross power of each of the received frequency components of signal ERROR and signal ROUT. Additionally, for each of the frequency sub-bands, the signal ERROR power and the signal ROUT power are averaged by the respective ARMA filter 500 and 505. Filter and normalization functionality 530 is arranged to determine, for each frequency band, an auto-regressive moving average of the determined cross power. The averaged cross power is then normalized by the averaged signals ERROR and ROUT. The averaged and normalized cross power is then multiplied by the averaged signal ROUT of ARMA filter 505 at multiplier 540. Subtractor 550 is arranged to subtract the output of multiplier 540 from the averaged signal ERROR of ARMA filter 500. The output of subtractor 550 thus provides the residual echo within signal ERROR.

Comparator 560 is arranged, for each frequency sub-band, to compare the residual echo with predetermined value THRESHOLD 1 to determine if the residual echo is significant enough to indicate that there was a change in near-end acoustic echo path 230. In the event that the residual echo for the particular frequency sub-band is greater than THRESHOLD 1, accumulator 565 is arranged to advance a stored number by 1. Thus, the combined operation of comparator 560 and accumulator 565 counts the number of frequency sub-bands where the residual echo is greater than predetermined value THRESHOLD 1. Comparator 570 is then arranged to compare the counted number of frequency sub-bands exhibiting an indication of a change in near-end acoustic echo path 230, i.e. the generated number of accumulator 565, with predetermined value THRESHOLD 2. In the event that the number of frequency sub-bands is greater than predetermined value THRESHOLD 2, comparator 570 is arranged to output to combination path change detection functionality 420 a high signal FS, indicating a change in near-end acoustic echo path 230. The detection of frequency domain path change detection functionality 410 is slower than the detection of time domain path change detection functionality 400, but it is more accurate.

Combination path change detection functionality 420 is arranged to determine a function of the received indication from frequency domain path change detection functionality 410 and the received indication from time domain path change detection functionality 400. In one embodiment, as will be described below, the function of the received indications comprises combination logic. In one particular embodiment, combination path change detection functionality 420 is arranged to determine whether at least one of frequency domain path change detection functionality 410 and time domain path change detection functionality 400 indicates that there has been a change in near-end acoustic echo path 230, i.e. at least one of signals FS and TS are high. In such an event, combination path change detection functionality is arranged to output an indication that there has been a change in near-end acoustic echo path 230.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A full duplex voice communication system comprising:
   a near-end input port arranged to receive a near-end signal;

a far-end input port in communication with a far-end communication device and arranged to receive a far-end signal from said far-end communication device;

an acoustic echo estimation functionality arranged, responsive to said received far-end signal, to estimate an acoustic echo within said received near-end signal;

an acoustic echo cancellation functionality arranged to cancel said estimated acoustic echo from said received near-end signal;

a frequency domain processing functionality;

a first switchable attenuation functionality;

a second switchable attenuation functionality;

an echo path change detection functionality arranged to detect a change in a near-end acoustic echo path;

a near-end speech detection functionality arranged to detect whether said received near-end signal represents speech;

a far-end silence detection functionality arranged to detect whether said received far-end signal represents silence; and a system coordination unit, wherein responsive to an output of said echo path change detection functionality, an output of said near-end speech detection functionality and an output of said far-end silence detection functionality, said system coordination unit is arranged to:

control said frequency domain processing functionality to alternately attenuate frequency components of said echo cancelled near-end signal by a first frequency domain attenuation value and by a second frequency domain attenuation value, said second frequency domain attenuation value greater than said first frequency domain attenuation value;

control said first switchable attenuation functionality to alternately attenuate a first function of an output of said frequency domain processing functionality by a first switchable attenuation value and by a second switchable attenuation value, said second switchable attenuation value greater than said first switchable attenuation value; and control said second switchable attenuation functionality to alternately attenuate a second function of said received far-end signal by a third switchable attenuation value and by a fourth switchable attenuation value, said fourth switchable attenuation value greater than said third switchable attenuation value.

2. The system of claim 1, wherein said arrangement of said system coordination unit to control said first switchable attenuation functionality to attenuate said first function of said output of said frequency domain processing functionality by said second switchable attenuation value and said arrangement of said system coordination unit to control said second switchable attenuation functionality to attenuate said second function of said received far-end signal by said fourth switchable attenuation value is responsive to detection of an acoustic echo path change by said echo path change detection functionality.

3. The system of claim 1, wherein said arrangement of said system coordination unit to control said frequency domain processing functionality to attenuate said frequency components of said echo cancelled near-end signal by said second frequency domain attenuation value is responsive to a combination of all three of:

detection of an acoustic echo path change by said echo path change detection functionality;

detection by said near-end speech detection functionality that said received near-end signal represents speech; and detection by said far-end silence detection functionality that said received far-end signal does not represent silence.

4. The system of claim 1, wherein responsive to said output of said echo path change detection functionality, said output of said near-end speech detection functionality and said output of said far-end silence detection functionality, said system coordination unit is further arranged to control said acoustic echo estimation functionality to alternately:

not update said estimated acoustic echo;

update said estimated acoustic echo at a first speed; and update said estimated acoustic echo at a second speed, said second speed greater than said first speed.

5. The system of claim 4, wherein said arrangement of said system coordination unit to control said acoustic echo estimation functionality to update said estimated acoustic echo at said second speed is responsive to a combination of all three of:

detection of an acoustic echo path change by said echo path change detection functionality;

detection by said near-end speech detection functionality that said received near-end signal does not represent speech; and detection by said far-end silence detection functionality that said received far-end signal does not represent silence.

6. The system of claim 1, further comprising a noise estimation functionality, wherein responsive to detection by said near-end speech detection functionality that said received near-end signal does not represent speech and detection by said far-end silence detection functionality that said received far-end signal represents silence, said system coordination unit is further arranged to control said noise estimation functionality to estimate near-end background noise responsive to said received near-end signal, and wherein said system coordination unit is further arranged to control said frequency domain processing functionality to output to said far-end output port a noise function of said estimated near-end background noise responsive to a combination of all three of:

no detection of an acoustic echo path change by said echo path change detection functionality;

detection by said near-end speech detection functionality that said received near-end signal does not represent speech; and detection by said far-end silence detection functionality that said received far-end signal does not represent silence.

7. The system of claim 1, further comprising:

a near-end saturation detection functionality arranged to detect an amplitude level of said received near-end signal; and a speaker saturation detection functionality arranged to detect an amplitude level of said received far-end signal, wherein said system coordination unit is further arranged, responsive to one of said detected amplitude level of said received near-end signal exceeding a near-end saturation value and said detected amplitude level of said received far-end signal exceeding a far-end saturation value, to control said acoustic echo estimation functionality to not update said estimated acoustic echo.

8. The system of claim 1, further comprising:
a near-end narrow band signal detection functionality arranged to detect a representation of a narrow band tone within said received near-end signal; and
a far-end narrow band signal detection functionality arranged to detect a representation of a narrow band tone within said received far-end signal,
wherein said system coordination unit is further arranged, responsive to one of said detected near-end narrow band tone and said detected far-end narrow band tone, to control said acoustic echo estimation functionality to not update said estimated acoustic echo.

9. The system of claim 1, wherein said echo path change detection functionality comprises:
a time domain path change detection functionality arranged to:
perform a time domain analysis of said received near-end signal;
detect a change in the near-end acoustic echo path responsive to said time domain analysis; and
output an indication of said detected change,
a frequency domain path change detection functionality arranged to:
perform a frequency domain analysis of said received far-end signal and of said echo cancelled near-end signal;
detect a change in the near-end acoustic echo path responsive to said frequency domain analysis; and
output an indication of said detected change, and
a combination path change detection functionality arranged to determine a third function of said output indication of said time domain path change detection functionality and said output indication of said frequency domain path change detection functionality,
wherein said acoustic echo path change detection of said echo path change detection functionality is responsive to said determined third function of said outputs.

10. A full duplex voice communication method, the method comprising:
receiving a near-end signal;
receiving a far-end signal from a far-end communication device;
estimating an acoustic echo within said received near-end signal responsive to said received far-end signal;
cancelling said estimated acoustic echo from said received near-end signal;
detecting whether, or not, a change has occurred in a near-end acoustic echo path;
detecting whether, or not, said received near-end signal represents speech; and
detecting whether, or not, said received far-end signal represents silence,
wherein, responsive to a result of said near-end acoustic echo path change detection, a result of said near-end signal speech representation detection and a result of said far-end silence representation detection, the method further comprises:
alternately attenuating frequency components of said echo cancelled near-end signal by a first frequency domain attenuation value and by a second frequency domain attenuation value, said second frequency domain attenuation value greater than said first frequency domain attenuation value;
alternately attenuating a first function of said frequency component attenuated echo cancelled near-end signal by a first switchable attenuation value and by a second switchable attenuation value, said second switchable attenuation value greater than said first switchable attenuation value; and
alternately attenuating a second function of said received far-end signal by a third switchable attenuation value and by a fourth switchable attenuation value, said fourth switchable attenuation value greater than said third switchable attenuation value.

11. The method of claim 10, wherein said attenuating said first function of said frequency component attenuated echo cancelled near-end signal by said second switchable attenuation value and said attenuating said second function of said received far-end signal by said fourth switchable attenuation value is responsive to detection of an acoustic echo path change.

12. The method of claim 10, wherein said attenuating said frequency components of said echo cancelled near-end signal by said second frequency domain attenuation value is responsive to a combination of all three of:
detection of an acoustic echo path change;
detection that said received near-end signal represents speech; and
detection that said received far-end signal does not represent silence.

13. The method of claim 10, wherein responsive to said result of said near-end acoustic echo path change detection, said result of said near-end signal speech representation detection and said result of said far-end silence representation detection, the method further comprises alternately:
not updating said estimated acoustic echo;
updating said estimated acoustic echo at a first speed; and
updating said estimated acoustic echo at a second speed, said second speed greater than said first speed.

14. The method of claim 13, wherein said updating said estimated acoustic echo at said second speed is responsive to a combination of all three of:
detection of an acoustic echo path change;
detection that said received near-end signal does not represent speech; and
detection that said received far-end signal does not represent silence.

15. The method of claim 10, further comprising:
responsive to detection that said received near-end signal does not represent speech and detection that said received far-end signal represents silence, estimating near-end background noise responsive to said received near-end signal; and
outputting a noise function of said estimated near-end background noise responsive to a combination of all three of:
detection of no acoustic echo path change;
detection that said received near-end signal does not represent speech; and
detection that said received far-end signal does not represent silence.

16. The method of claim 10, further comprising:
detecting an amplitude level of said received near-end signal;
detecting an amplitude level of said received far-end signal; and
responsive to one of said detected amplitude level of said received near-end signal exceeding a near-end saturation value and said detected amplitude level of said received far-end signal exceeding a far-end saturation value, not updating said estimated acoustic echo.

17. The method of claim 10, further comprising:
detecting whether, or not, a representation of a narrow band tone is present within said received near-end signal;
detecting whether, or not, a representation of a narrow band tone is present within said received far-end signal; and
responsive to one of detection of said narrow band tone representation within said received near-end signal and detection of said narrow band tone representation within said received far-end signal, not updating said estimated acoustic echo.

18. The method of claim 10, wherein said echo path change detecting comprises:
performing a time domain analysis of said received near-end signal;
detecting a change in the near-end acoustic echo path responsive to said time domain analysis;
outputting an indication of said time domain detected change;
performing a frequency domain analysis of said received far-end signal and of said echo cancelled near-end signal;
detecting a change in the near-end acoustic echo path responsive to said frequency domain analysis;
outputting an indication of said frequency domain detected change; and
determining a third function of said output time domain indication and said output frequency domain indication,
wherein said acoustic echo path change detection is responsive to said determined third function.

19. A full duplex voice communication system comprising:
a near-end input port arranged to receive a near-end signal;
a far-end input port in communication with a far-end communication device and arranged to receive a far-end signal from said far-end communication device;
an acoustic echo estimation functionality arranged, responsive to said received far-end signal, to estimate an acoustic echo within said received near-end signal;
an acoustic echo cancellation functionality arranged to cancel said estimated acoustic echo from said received near-end signal;
a frequency domain processing functionality;
an echo path change detection functionality arranged to detect a change in a near-end acoustic echo path;
a near-end speech detection functionality arranged to detect whether said received near-end signal represents speech;
a far-end silence detection functionality arranged to detect whether said received far-end signal represents silence; and
a system coordination unit,
wherein said system coordination unit is arranged to:
responsive to a lack of detection of said change in the near-end acoustic echo path by said echo path change detection functionality, detection that said received near-end signal represents speech and detection that said received far-end signal does not represent silence, control said frequency domain processing functionality to attenuate frequency components of said echo cancelled near-end signal by a first frequency domain attenuation value; and
responsive to detection of said change in the near-end acoustic echo path by said echo path change detection functionality, detection that said received near-end signal represents speech and detection that said received far-end signal does not represent silence, control said frequency domain processing functionality to attenuate frequency components of said echo cancelled near-end signal by a second frequency domain attenuation value, said second frequency domain attenuation value greater than said first frequency domain attenuation value.

20. The full duplex voice communication system of claim 19, further comprising:
a near-end narrow band signal detection functionality arranged to detect a representation of a narrow band tone within said received near-end signal; and
a far-end narrow band signal detection functionality arranged to detect a representation of a narrow band tone within said received far-end signal,
wherein said system coordination unit is further arranged, responsive to one of said detected near-end narrow band tone and said detected far-end narrow band tone, to control said acoustic echo estimation functionality to not update said estimated acoustic echo.

\* \* \* \* \*